(12) United States Patent
Nyhavn et al.

(10) Patent No.: US 10,895,148 B2
(45) Date of Patent: Jan. 19, 2021

(54) ONLINE TRACER MONITORING AND TRACER METER

(71) Applicant: Resman AS, Ranheim (NO)

(72) Inventors: Fridtjof Nyhavn, Trondheim (NO); Thomas Sperle, Ranheim (NO)

(73) Assignee: RESMAN AS, Ranheim (NO)

( * ) Notice: Subject to any disclaimer, the term of this patent is extended or adjusted under 35 U.S.C. 154(b) by 0 days.

(21) Appl. No.: 16/672,055

(22) Filed: Nov. 1, 2019

(65) Prior Publication Data

US 2020/0141227 A1     May 7, 2020

Related U.S. Application Data

(63) Continuation of application No. 15/536,605, filed as application No. PCT/NO2015/050260 on Dec. 23, 2015, now abandoned.

(30) Foreign Application Priority Data

Dec. 23, 2014   (NO) .................................. 20141559

(51) Int. Cl.
*E21B 47/11*     (2012.01)
*G01V 15/00*    (2006.01)
(Continued)

(52) U.S. Cl.
CPC .............. *E21B 47/11* (2020.05); *E21B 43/38* (2013.01); *E21B 49/08* (2013.01); *G01V 15/00* (2013.01); *E21B 34/06* (2013.01)

(58) Field of Classification Search
CPC ...... E21B 47/1015; E21B 43/38; E21B 49/08; E21B 34/06; G01V 15/00
See application file for complete search history.

(56) References Cited

U.S. PATENT DOCUMENTS

| 5,723,093 A | 3/1998 | De Bruyne et al. |
| 6,281,489 B1 | 8/2001 | Tubel et al. |

(Continued)

FOREIGN PATENT DOCUMENTS

| WO | WO 01/81914 A1 | 11/2001 |
| WO | WO 2009/077758 A1 | 6/2009 |

(Continued)

OTHER PUBLICATIONS

"Advancements in Tracer Flow Testing; Development of Real-Time Technology for Flow and Enthalpy Measurements", USC Center for Geothermal Studies Distinguished Speaker Program, URL: http://cgs.usc.edu/assets/001/79618.pdf, Feb. 27, 2012, pp. 1-27.

(Continued)

*Primary Examiner* — Crystal J Miller
(74) *Attorney, Agent, or Firm* — Birch, Stewart, Kolasch & Birch, LLP

(57) ABSTRACT

A tracer method for online monitoring of downhole zonal contributions of oil, condensate, gas, or water mass flux of a production flow in a petroleum production well, includes arranging distinct tracer carrier systems, each in different production zones in said well, the distinct tracer carrier systems arranged for releasing unique tracers to a fluid of the production zones, the tracers having affinity after downhole release to separate phases of oil, condensate, gas, or water, using an online tracer monitor, conducting sampling of tracer concentrations for at least one of the tracers in said zonal mass fluxes at a high sampling rate, based on said concentration values, estimating the corresponding zonal tracer fluxes for each delivery data point and using said one or more estimated zonal mass fluxes to control one or more Petro Technical processes.

19 Claims, 19 Drawing Sheets

Modeling the wellbore and near-wellbore flow physics

(51) Int. Cl.
*E21B 43/38* (2006.01)
*E21B 49/08* (2006.01)
*E21B 34/06* (2006.01)

(56) References Cited

U.S. PATENT DOCUMENTS

| | | | |
|---|---|---|---|
| 8,275,549 B2* | 9/2012 | Ramirez Sabag | E21B 47/1015 702/12 |
| 2002/0139197 A1 | 10/2002 | Salamitou et al. | |
| 2006/0144588 A1 | 7/2006 | Ferguson et al. | |
| 2008/0316049 A1* | 12/2008 | Verret | E21B 47/10 340/854.6 |
| 2010/0307745 A1 | 12/2010 | Lafitte et al. | |
| 2011/0040484 A1* | 2/2011 | Ramirez Sabag | E21B 44/00 702/8 |
| 2011/0040485 A1 | 2/2011 | Ong | |
| 2011/0040501 A1* | 2/2011 | Martin | E21B 47/10 702/45 |
| 2012/0004776 A1* | 1/2012 | Abad | C09K 8/03 700/265 |
| 2013/0017610 A1 | 1/2013 | Roberts et al. | |
| 2013/0268198 A1* | 10/2013 | Nyhavn | E21B 47/1015 702/6 |
| 2014/0260694 A1 | 9/2014 | Szlendak | |
| 2015/0130468 A1* | 5/2015 | Christian | E21B 47/1015 324/324 |
| 2017/0131226 A1* | 5/2017 | Boul | E21B 33/13 |

FOREIGN PATENT DOCUMENTS

| | | |
|---|---|---|
| WO | WO 2011/132040 A2 | 10/2011 |
| WO | WO 2012/057634 A1 | 5/2012 |
| WO | WO 2012/177147 A2 | 12/2012 |
| WO | WO 2013/062417 A1 | 5/2013 |

OTHER PUBLICATIONS

"Inflow oil and Water production profiling using chemical tracer technology", Reservoir Characterisation, URL: http://www.tracerco.com/case-studies/inflow-oil-and-water-production-profiling, Jun. 8, 2012, pp. 1-2.
"Oilfield Review: Petroleum Systems, Multiphase Sampling, Crosswell Reservoir Monitoring", Schlumberger, vol. 21, No. 2, Summer 2009, pp. 1-68.
International Search Report issued in PCT/NO2015/050260 (PCT/ISA/210), dated Aug. 1, 2016.
Written Opinion of the International Preliminary Examining Authority issued in PCT/NO2015/050260 (PCT/IPEA/408), dated Feb. 6, 2017.
Written Opinion of the International Searching Authority issued in PCT/NO2015/050260 (PCT/ISA/237), dated Aug. 1, 2016.
Broaddus et al., "Advancements in Tracer Flow Testing; Development of Real-Time Technology for Flow and Enthalpy Measurements." Proceedings World Geothermal Congress, Apr. 25-29, 2010, 5 pages.

\* cited by examiner

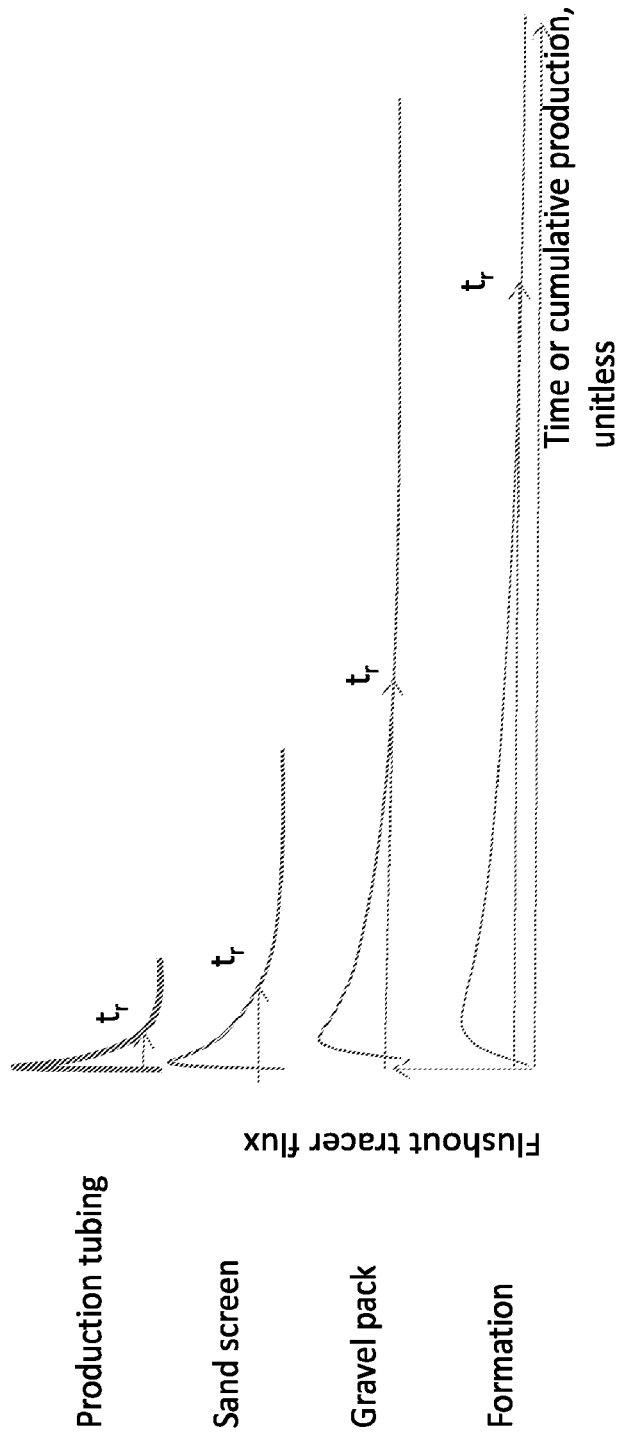

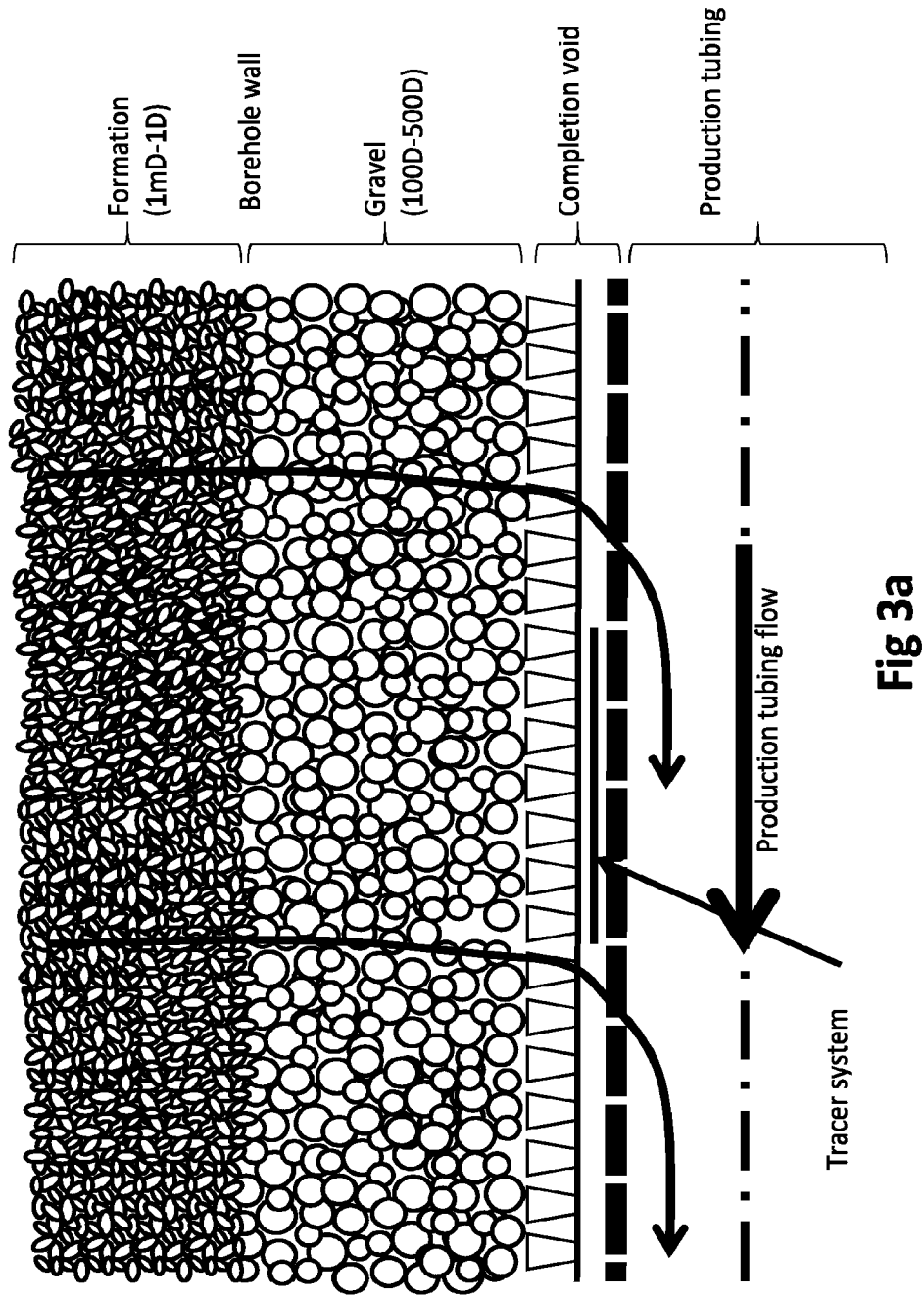

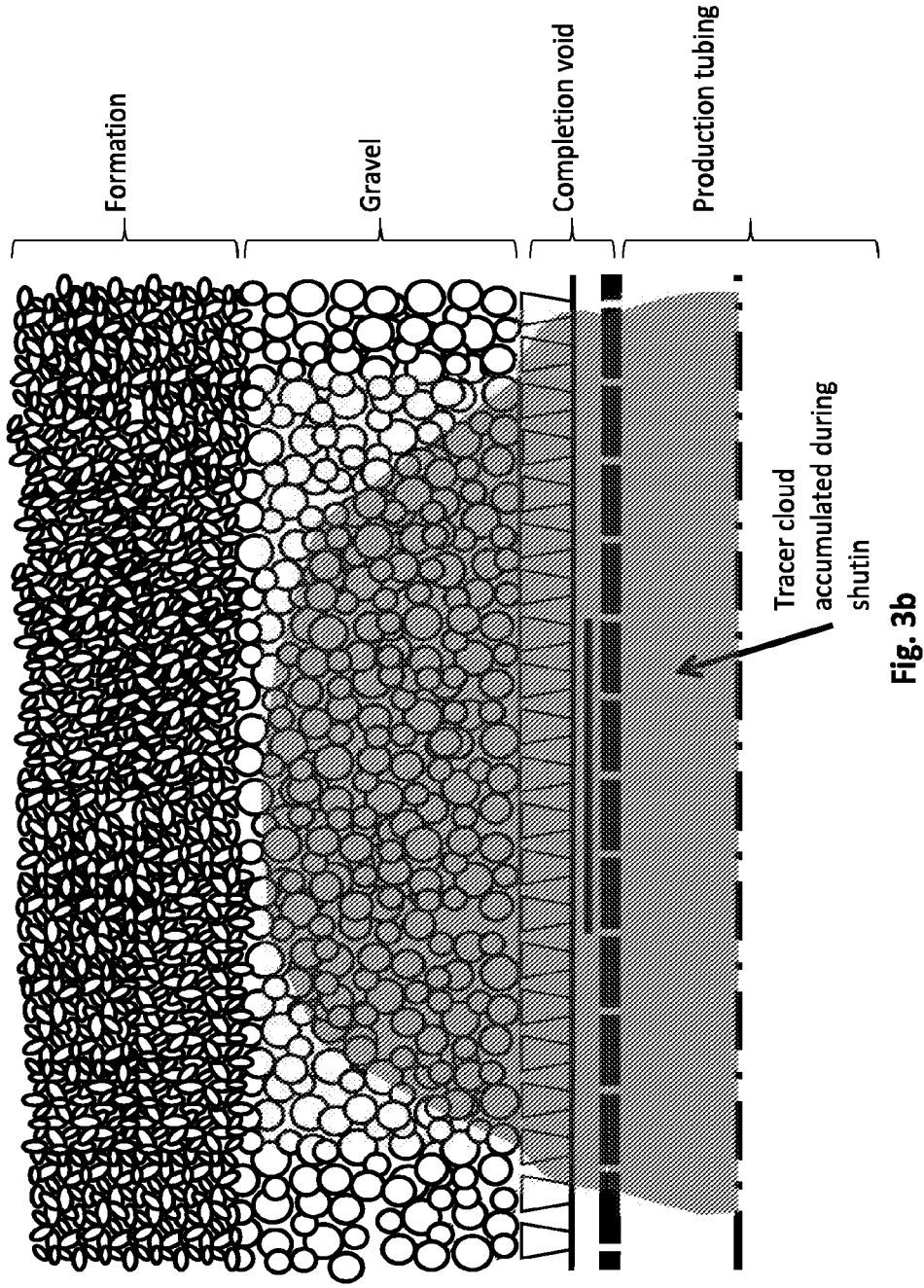

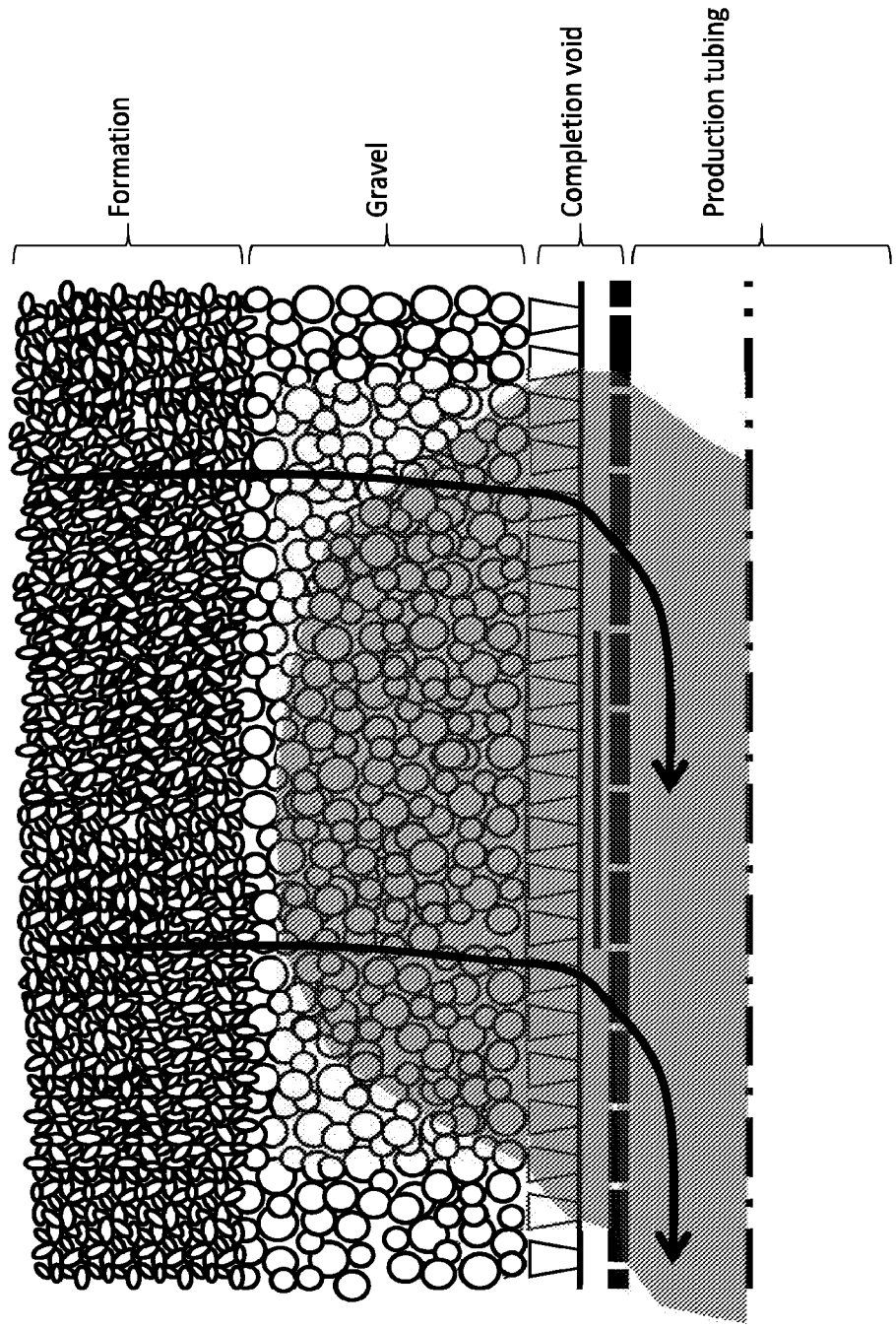

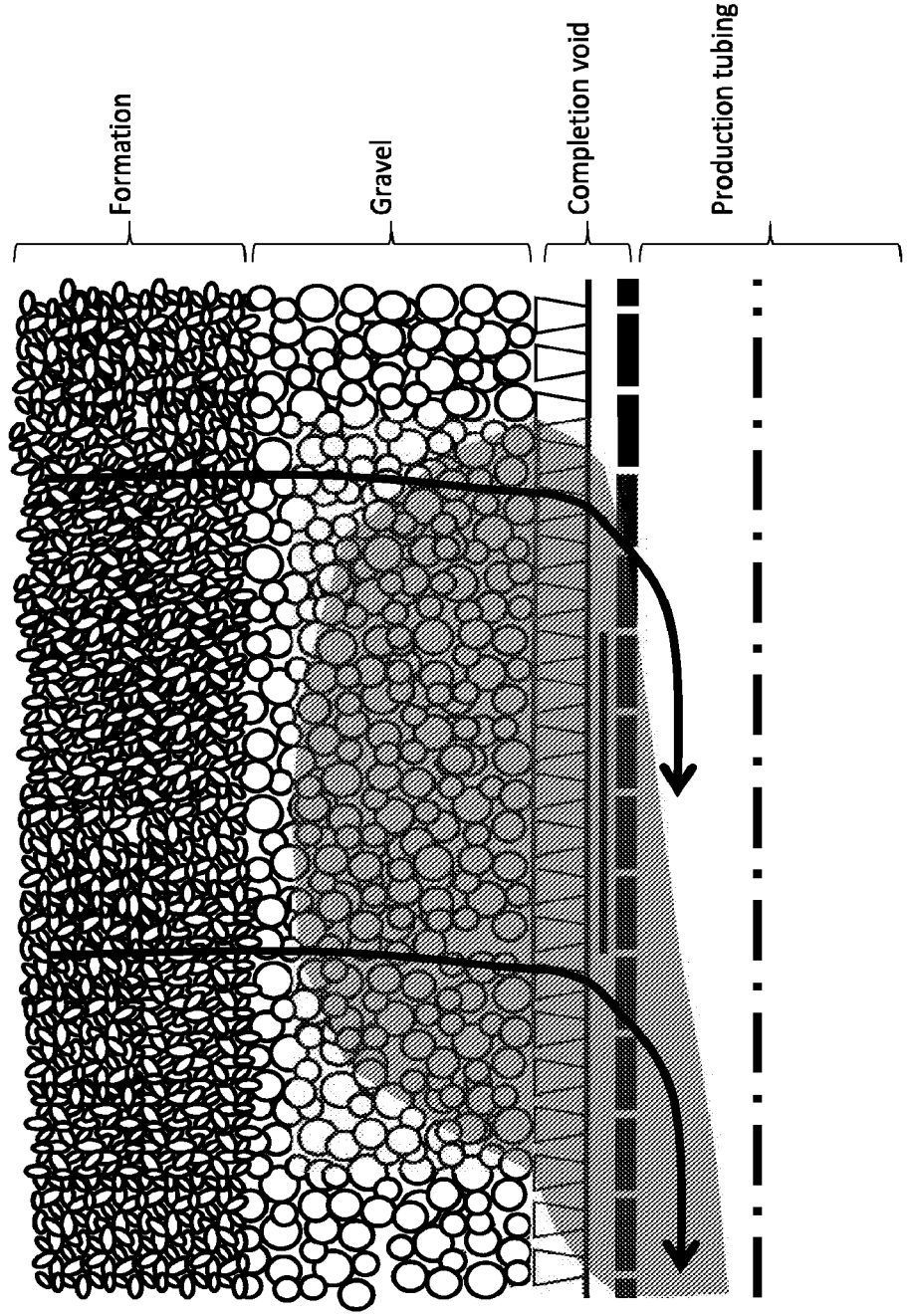

One promising Non-Linear effect that may be used as stand-alone or in combination with other techniques:

- The tracer particles flow through a ring-shaped transducer array where they are exposed to a dual-frequency acoustic field.
- The high frequency is used for particle image reconstruction (detection) while the low frequency is used to manipulate the scattering properties from and/or propagation through the particles; - one may say that the high frequency scattering is dependent of the phase of the low frequency.
- By this, a good discrimination between sand/dirt/gas bubbles and the tracers particles can be obtained. Tracer particles are selected and tuned so that their nonlinear responses are as different from sand/dirt as possible.
- The technique is described in US2005/0277835A1 and has been demonstrated in several applications, but not for hydrocarbon production flow.

Soon as tracer particles are selected from sand/dirt/gas, their concentrations are obtained by standard processing technique.

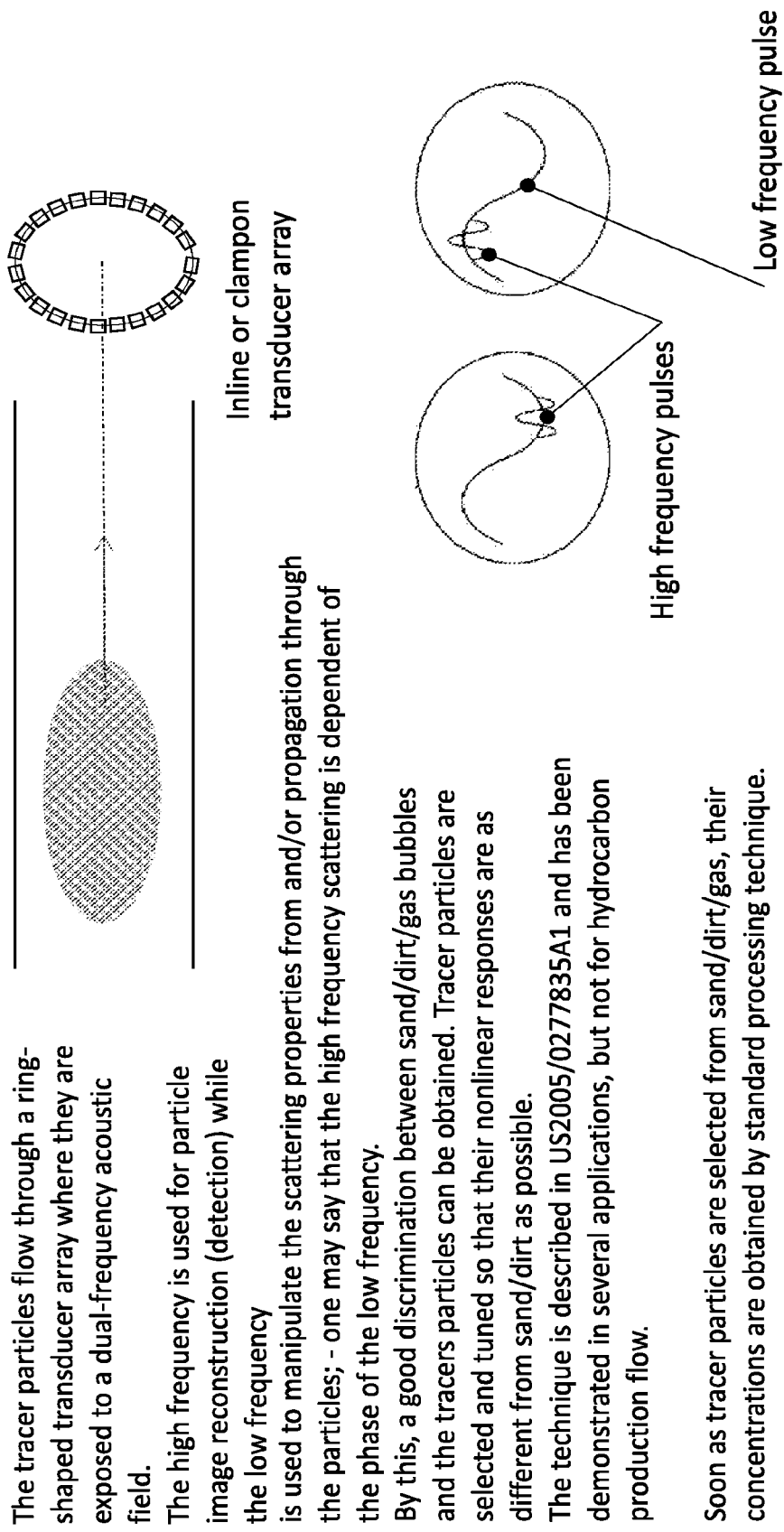

Fig. 10

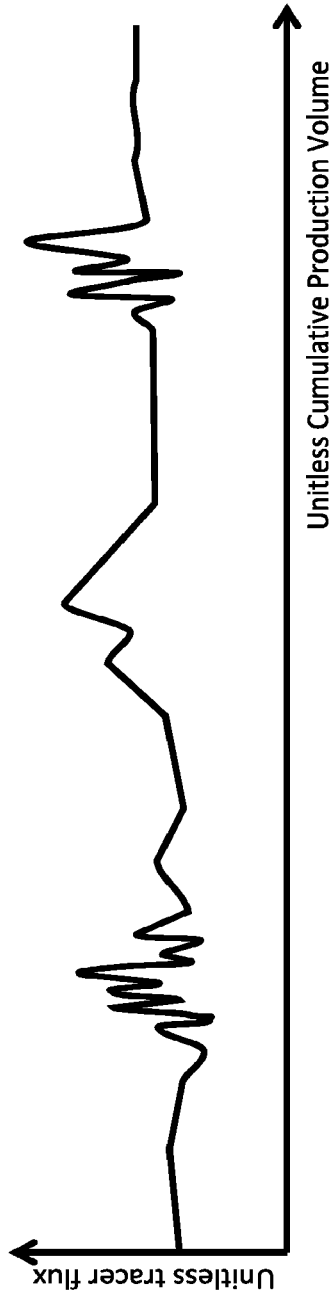
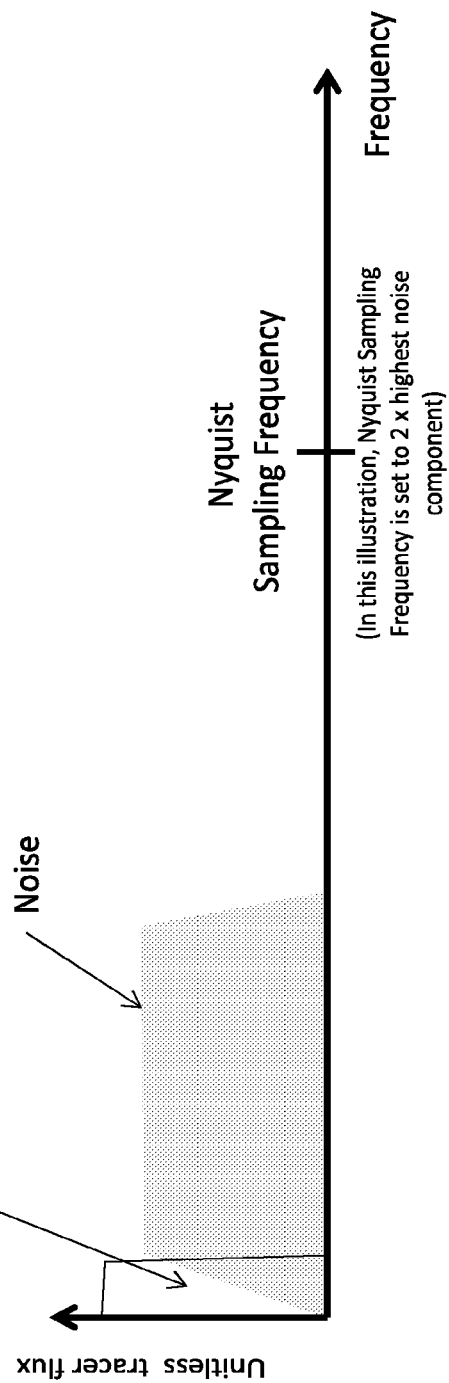
Fig. 11a

US 10,895,148 B2

ONLINE TRACER MONITORING AND TRACER METER

CROSS-REFERENCE TO RELATED APPLICATIONS

This application is a Continuation of co-pending application Ser. No. 15/536,605 filed on Jun. 15, 2017, which is a National Phase of PCT International Application No. PCT/NO2015/050260 filed on Dec. 23, 2015, which claims priority under 35 U.S.C. § 119(a) to Patent Application No. 20141559 filed in Norway on Dec. 23, 2014. All of the above applications are hereby expressly incorporated by reference into the present application.

INTRODUCTION

The present invention relates to a method and an apparatus for online monitoring of tracer concentration of oil-, condensate-, gas-, or water-following tracers in a production flow in a petroleum well, if required, estimating the tracer flux, and with the objective of estimating downhole inflow profiles of one or more of the fluid phases.

More specifically the invention is a method for high frequency online monitoring tracer concentration of oil-, condensate-, gas-, or water-following tracers in a production flow, comprising arranging distinct tracer carrier systems in different production zones in a well for releasing tracers to a fluid of the production zones, allowing all or part of a production flow of said well to be separated into two or more segregated fluids and using an online tracer monitoring system for measuring concentrations of possible said unique tracers in at least one of said segregated phases. The monitoring system may be based on a combination of one or more sensor principles.

BACKGROUND AND RELATED ART

Throughout this document, the terms "samples" and "sampling" relates to discrete time values of
tracer concentrations; —number of particles/molecules per volume unit, or tracer fluxes; —flow of particles/molecules per time unit.

Exceptions are when fluid samples and fluid sampling are used to point at the material fluid (liquid or gas) volume from which the concentrations and fluxes are sampled.

Tracers are commonly used for monitoring of oil and gas wells to e.g. verifying the success of a clean-up process during the completion of a well, for early alarming the operator upon water breakthrough or for reservoir monitoring for example by analysis and modelling of downhole inflow profiles, by exploiting tracer flow back transients.

The applicant has, during the latest 10 years, established a petroleum service wherein tracers are used to answer as much as possible of the basic, slogan-like question: "What flows where and how much"? The tracer responses, as they appear at surface, are seldom directly usable for the customer without some data MANAGEMENT and interpretations. The services delivered to the client or "Operator", which may be an oil company operating a petroleum producing field, may be called Real-Time or Timely Services when they are ACQUIRED, MANAGED and DELIVERED to the Operator's Workflow to enable/aid/impact a Petro Technical Process (U1, U2, . . . ), please see FIG. 1B.

But the AQUIREMENT of raw data is not necessarily done with the same speed as the Real-Time requirements of the DELIVERIES. Real-Time requirements for a customer are seldom at a higher frequency than one good "data point" per hour or as little as one data point per day (a data point can be something like the estimated inflow profile during a ramp up or at a certain rate). However, behind each good delivered such data point is normally a series of much higher frequency raw data points; a requirement for following all relevant flow dynamics physics. This can in extreme cases, e.g. when tracers are injected directly into the production tubing, mean relevant flow variations up to one variation per 10 sec (0.1 Hz). The present invention relates to such high frequency raw data that is the basis and requirement for producing high quality Real-Time Service DELIVERIES.

Traditionally, tracer concentrations are measured by taking fluid samples out of the production flow, top side, during so-called "campaigns", and then perform the analysis in a laboratory, usually on shore. The transport from the sampling site to the laboratory may include marine helicopter transport, and may take several hours to reach the laboratory at the very best, so there is no talk of real-time sampling and analysis in the state of the art. The present practice is a time consuming and demanding procedure. There is also a cost component to it that leads to minimizing the number of fluid samples to be analyzed. Such campaigns might define the frequency for withdrawal of fluid samples to e.g. maximum every 5 minutes. Fluid sampling is manually performed by an operator. Thus, long campaigns will become unwieldy; the fluid samples may be manually withdrawn from the production flow by an operator, and the filling and handling of pre-marked bottles may take up to 4½ minutes to achieve the goal of 5 minutes fluid sampling frequency which is the goal of the present practice. The harsh environment at the production fluid sampling site may easily incur a loss or untimely fluid sampling of one or more of the fluid samples. A higher frequency of fluid sampling will be too difficult to carry out with present practice. This motivates automation.

Some approaches to automatic fluid sampling and analysis are made, and WO2011132040A2 describes a method for monitoring wellbore comprising placing tracers in subterranean locations within or proximate the wellbore, repeatedly taking fluid samples from the flow from the wellbore, and analyzing the fluid samples for the presence of tracer. A one per hour fluid sampling rate is indicated. Fluorescent tracers released by water, or on a signal from top side, are used, and detected/quantified topside by spectroscopy. The system may also be used for a quantitative analysis by voltammetry and then a water soluble tracer capable of undergoing for instance a redox reaction may be used. The fluid samples are extracted from one phase after permanently separation of the flow into water, oil and gas, by a production-scale separator or from a temporarily acting separator. Fluid samples are taken at the surface by automatic equipment controlled by a programmed computer, but flasks collecting the fluid samples are still used. The inspection and measurement is automatically carried out e.g. every hour by inspection of the fluid sample in the flask, placed at a rotary table. The rotary table may contain about 30 containers and has to be refilled by fresh containers manually by an operator daily when the fluid sampling frequency is about one fluid sample per hour.

Another automatic fluid sampling and measuring system is described in US20140260694A1. Tracers are injected to a reservoir or aquifer, and thereafter produced and fluid sampled to measure for tracer concentration; that is, the tracer is arranged outside the wellbore. A fluid sampling device, piping and an automated solution is installed as an integrated inline system at or near a wellhead or production manifold. The fluid sampling system is computer controlled. The sampling frequency mentioned is limited to very low frequency fluid sampling, e.g. in the range between every 4$^{th}$ to 24$^{th}$ hour. The system further comprises a filtering system, a phase separation device, and a measurement device. Some examples of tracers used are e.g. fluorinated benzoic acids, fluorescein dyes, fluorescing nano crystals or particles and radioactive tracers, and arranged for be detected by laboratory spectroscopes, fiber optic fluorospectroscopes, Hall Effect sensors, fluorimeters, Geiger counters, gas chromatography measurement devices, and post column reaction spectroscopes and limited to detection of tracers in a liquid or aqueous phase. The fluid sampling frequency is, as mentioned above, limited to low frequency fluid sampling, e.g. in the range between every 4$^{th}$ to 24$^{th}$ hour. Due to the slow flow fluid velocities in a permeable formation rock outside the wellbore, such an "ultra low" fluid sampling frequency may be sufficient for detecting the fastest tracer signals due to production of tracer with the fluids from the formation. Fluids fluid sampling for compositional analysis is another area that show techniques relevant for this invention. In Oilfield Review Summer 2009; 21, no. 2 a novel approach is presented.

SHORT FIGURE CAPTION

FIG. 2 is roughly indicates different residence times, "$t_r$", for different types of well components acting, intentionally or not, as tracer delay chambers, during flushout, after a build-up of tracer locally due to a halt in the production flow, or due to an injection of a tracer cloud, or the combination of the two.

FIG. 3a shows a normal production scenario with a tracer system arranged outside the Production tubing. In the illustrated embodiment the tracer system, which releases tracer molecules or particles, is arranged in the annulus, more specifically in the completion void between the production tubing and a metal sand screen. A gravel pack here fills the remainder of the annulus, radially up to the borehole wall to the reservoir formation.

FIG. 3b indicates a so-called tracer cloud which may form by diffusion during shut-in of a well, wherein fluids move minimally in the example illustrated For longer shut in periods the cloud will probably spread past the borehole wall and into the reservoir formation as well.

FIG. 3c illustrates the situation just after opening/reopening the chokes; production flow has started or resumed in the production tubing adjacent to the built up tracer cloud. The tracers in the production tubing starts flowing to the surface, but the response time for the tracer cloud parts, the tracer residence times, in the completion void and within the gravel are generally progressively longer with increasing distance from the production tubing axis.

FIG. 3d illustrates a subsequent stage in the flushing process wherein much of the tracers in the tubing have followed along with the production flow and the part of the tracer cloud in the completion void has also started to follow along with the production flow.

Figure 3E:
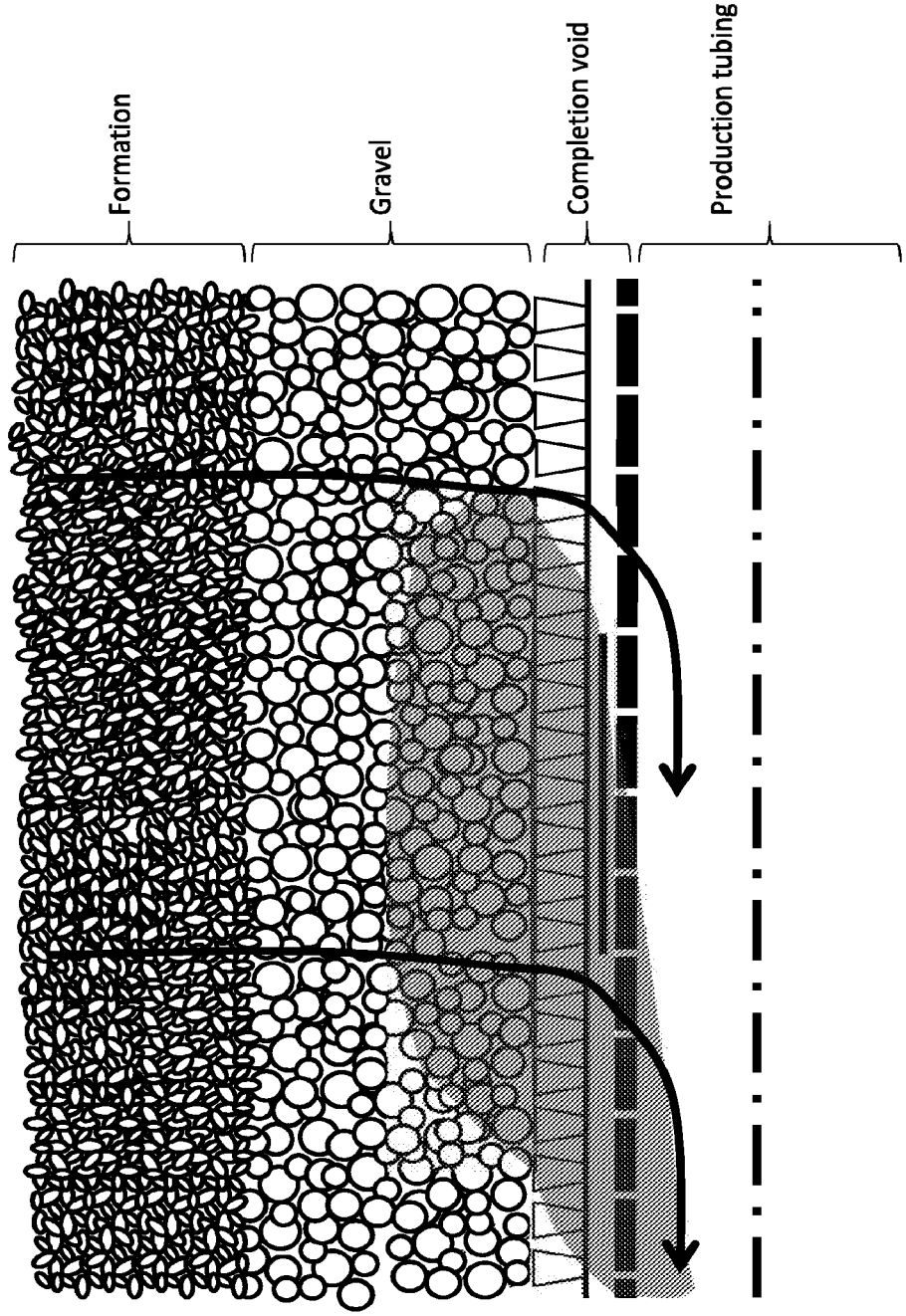
FIG. 3a to FIG. 3d are illustrations similar to FIG. 1B.

FIG. 3e illustrates a subsequent stage in the flushing process wherein the tracer cloud in the gravel has also been partly flushed out to follow along with the production flow, and also having migrated significantly away from the borehole wall. The steps of FIGS. 3a to 3d are, with a normal production flow, expected to take 20-30 seconds or considerably longer time up to several minutes. The flushing of the gravel, scenario 3e, may take up to an hour.

Figure 4:
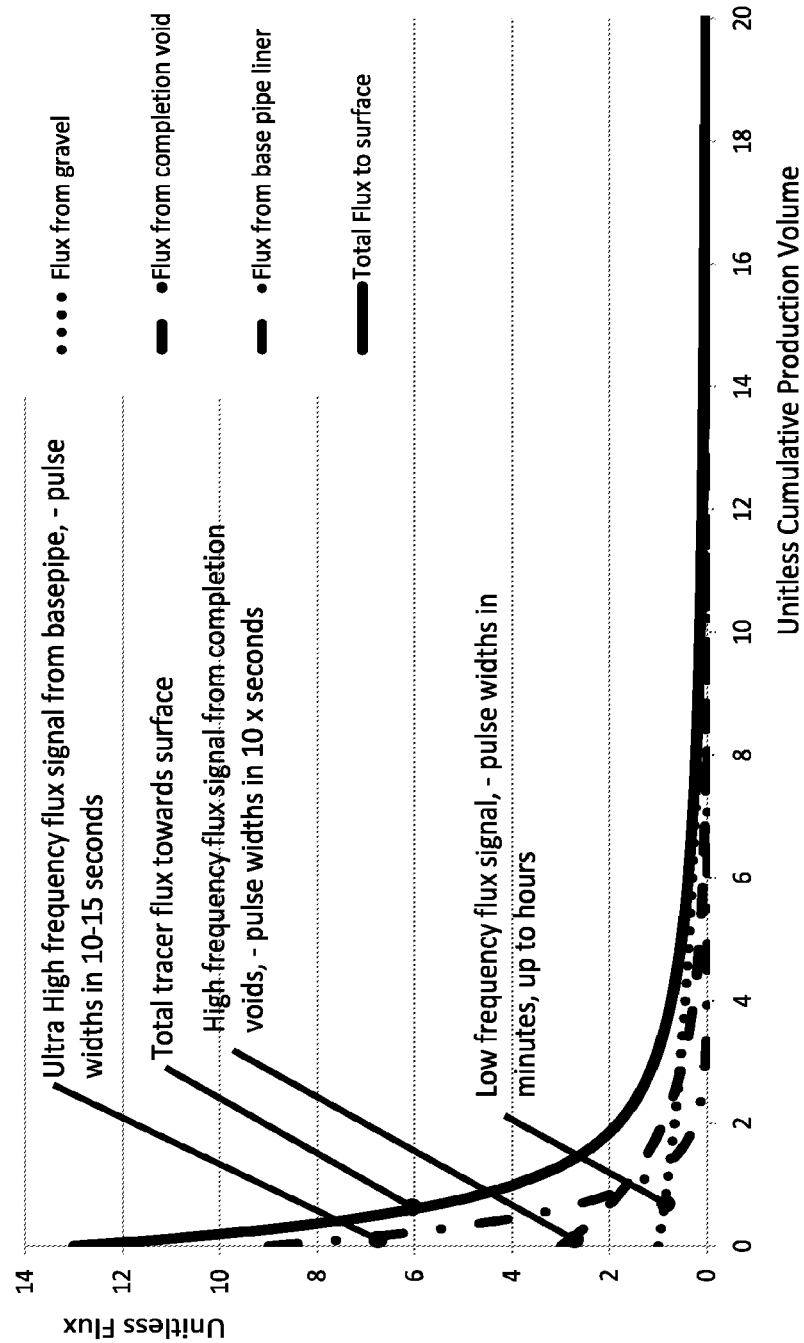

FIG. 4 is a diagram showing zonal tracer flux towards the surface with fully vented sand screen (completion void) and gravel pack, as was illustrated in FIGS. 3a-3e. A so-called "ultra-high frequency" zonal tracer flux signal may have arisen due to the flushing out of the base pipe (Production tubing) as such, with a pulse "width" of 10-15 seconds. A lower, but still high frequency tracer signal is due to the flushing out from the completion voids. Further, there is a low frequency tracer signal from the flush out from the gravel, with a pulse width on the order of minutes to hours.

Figure 5:
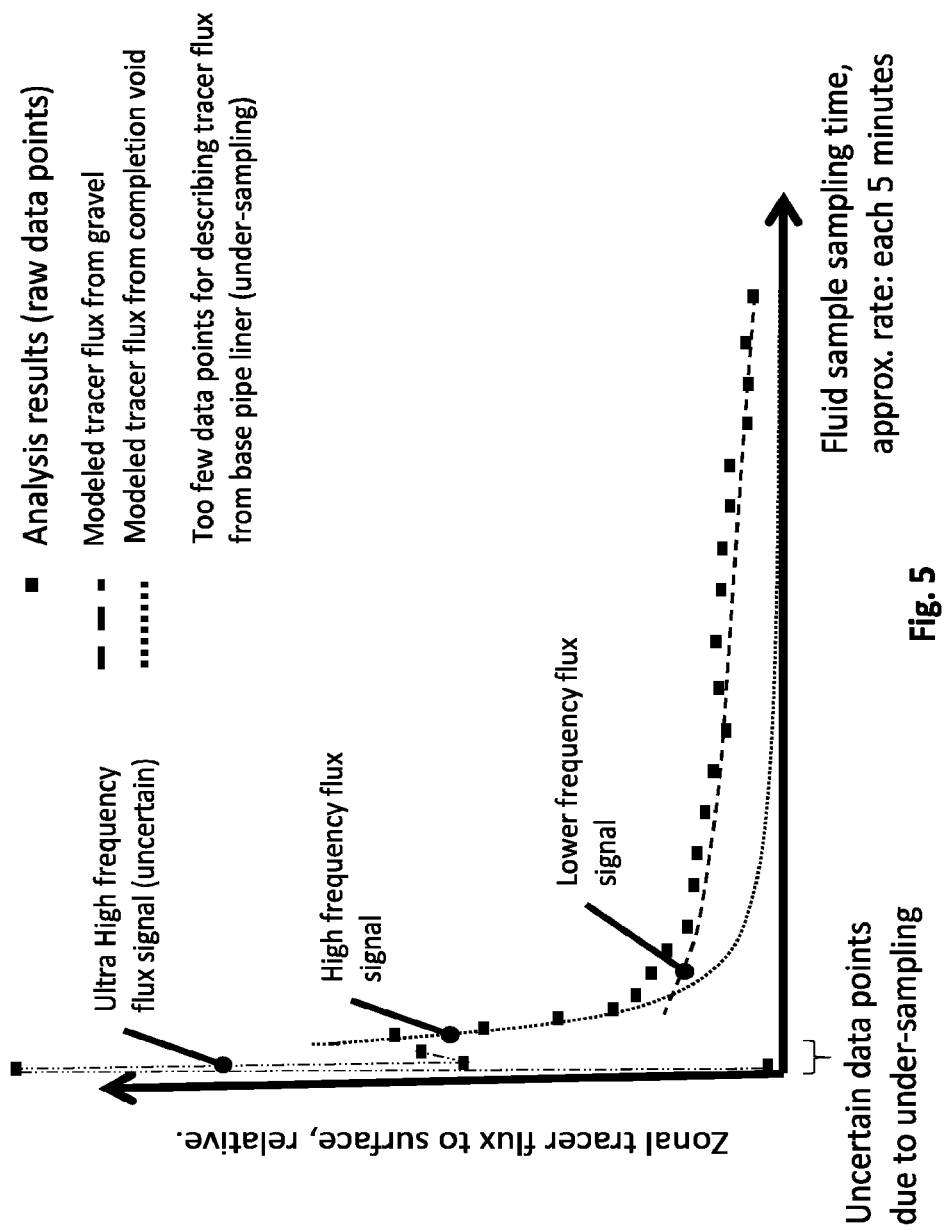

FIG. 5 shows data from a real well. Zonal tracer flux to surface is shown. The fluid sampling interval is every 5$^{th}$ minute. A modeled separation of the measurements into a high frequency zonal tracer flux signal and a lower frequency zonal tracer flux signal has been drawn. There are, due to under-sampling in the fluid sampling (too low fluid sampling frequency), too few data points in the beginning of the fluid sampling series to discern the zonal tracer flux flushout from the base pipe liner.

Figure 1A:
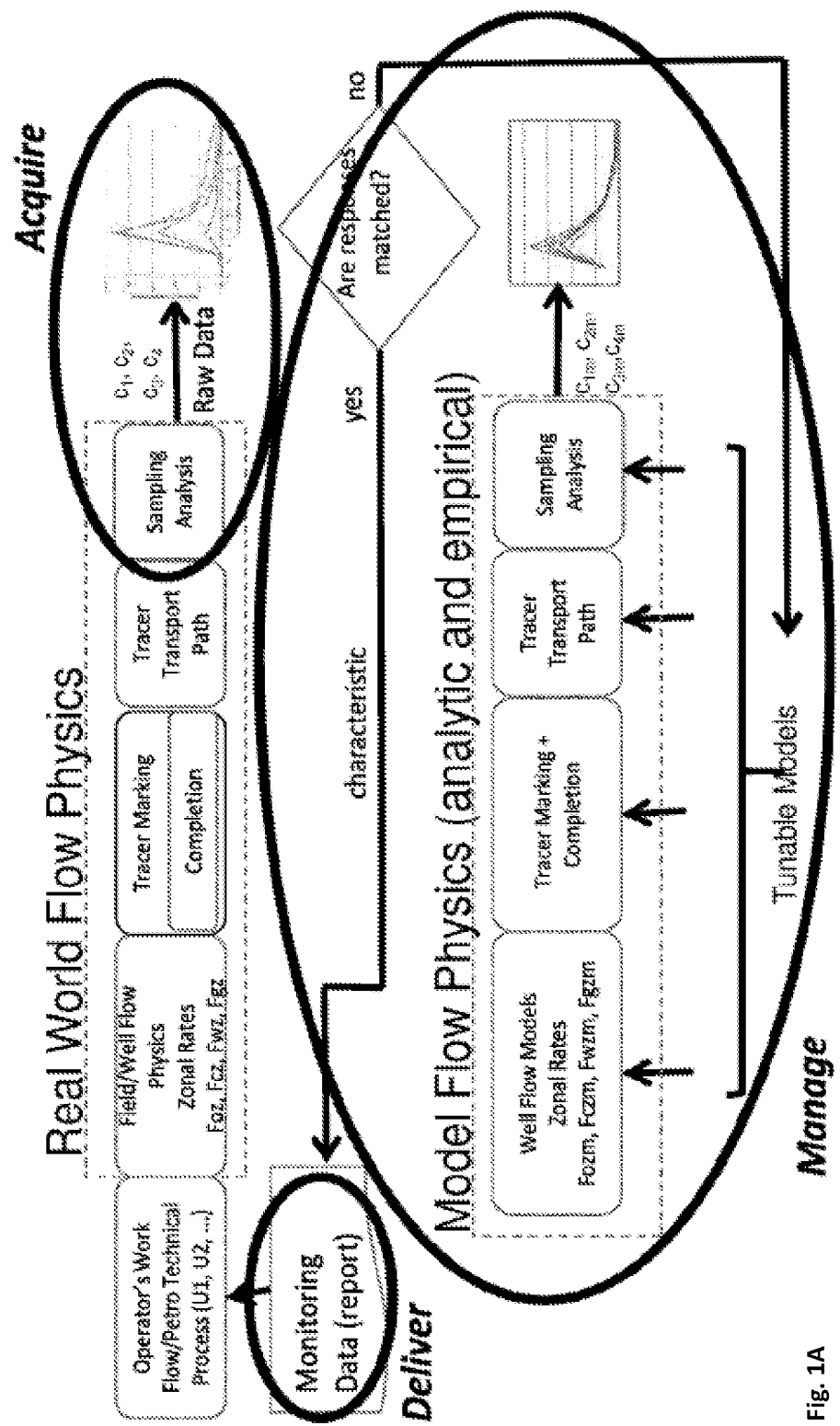
FIG. 1A is an illustration of a rough overview of the applicant's work process related to ACQUIRE, MANAGE and DELIVER monitoring data to customers. The present invention relates to the ACQUISITION part of the process and more specifically how Raw Data are acquired.
Figure 1B:
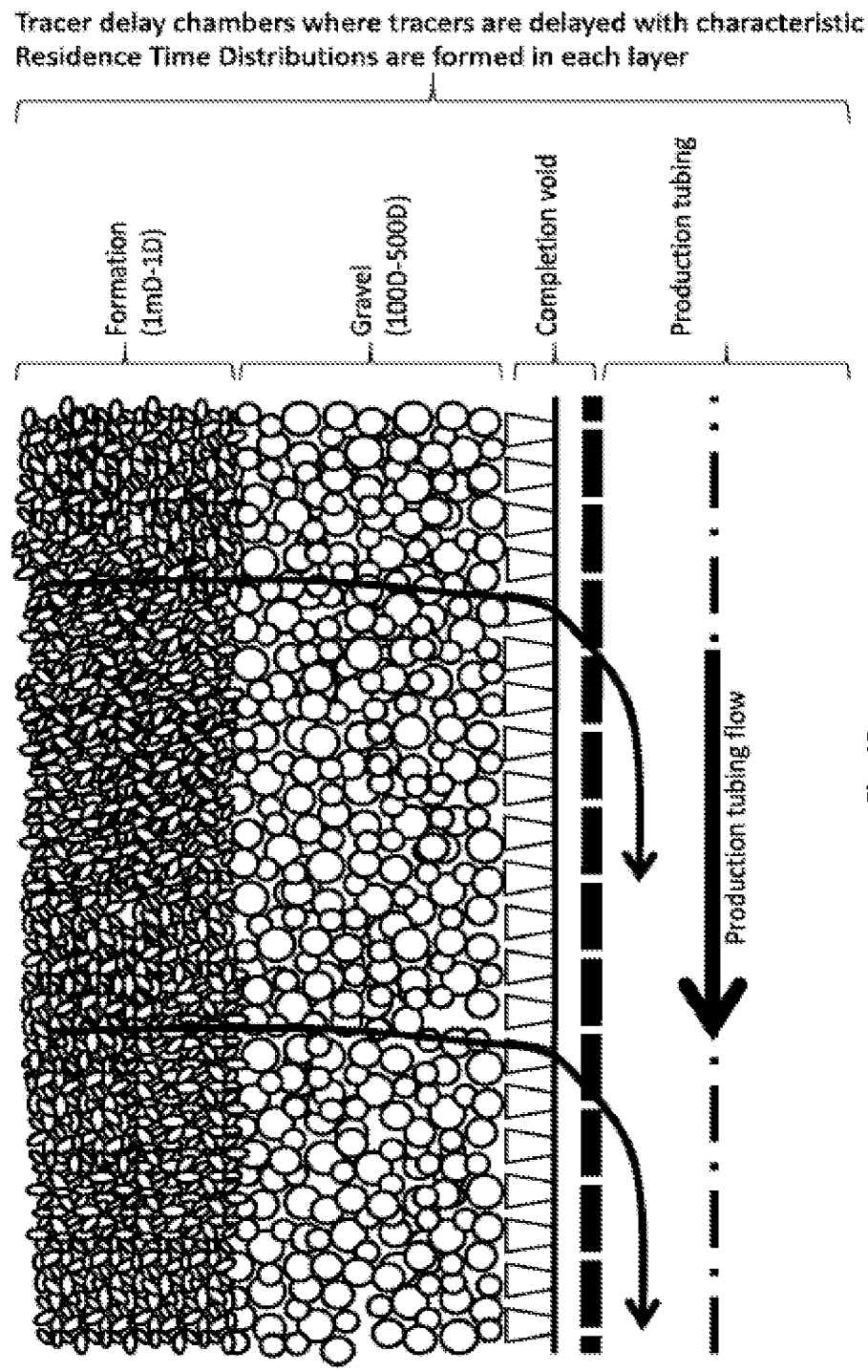
FIG. 1B is an illustration of a section view of a limited section of a wellbore and it's near-wellbore and indicates the Flow Physics through the finer reservoir formation and the layers of subsequently increasing permeability, gravel pack, completion void of the completion, and into the Production tubing flow.
Figure 6:
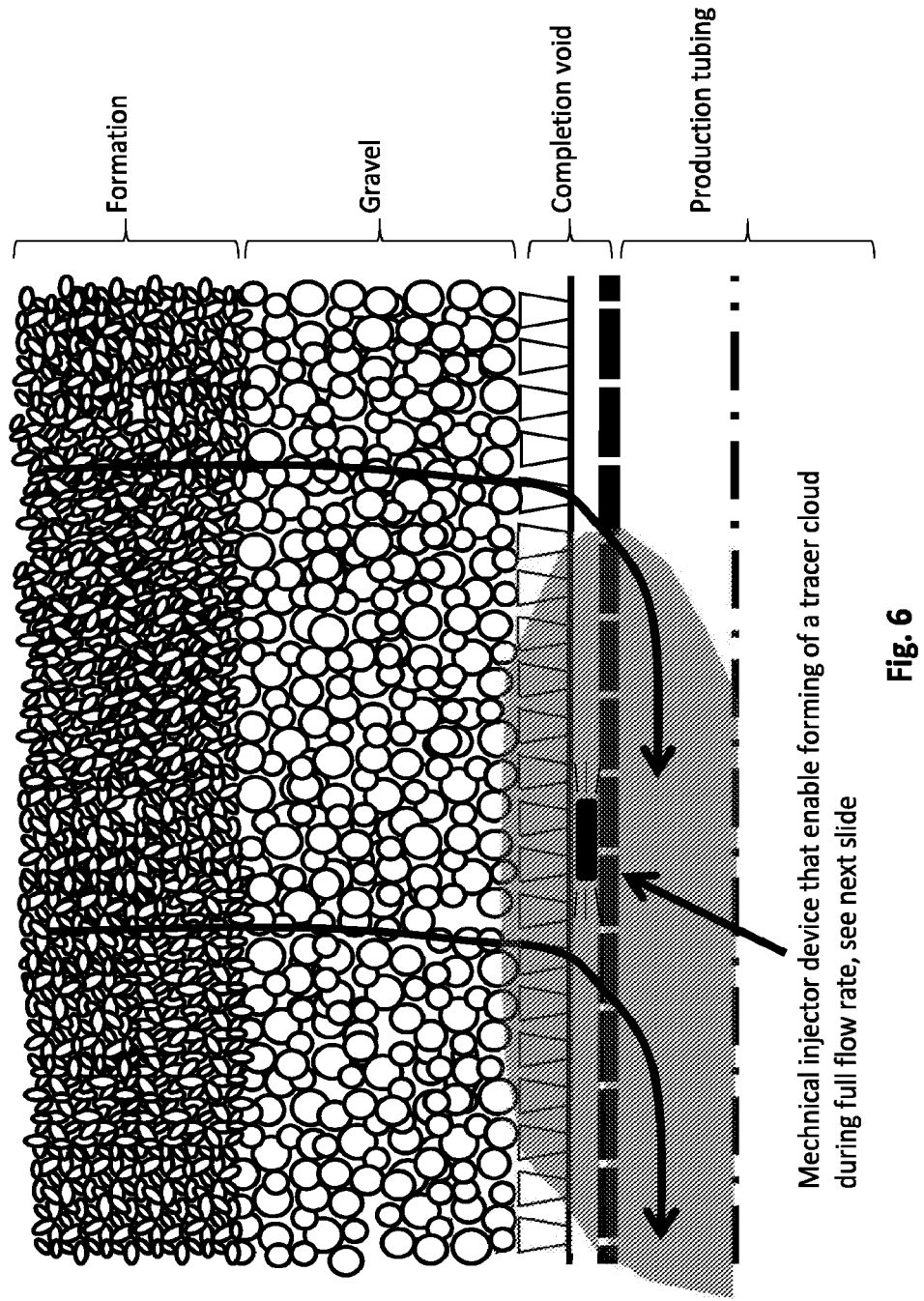

FIG. 6 is a section of a production well similar to the view of FIG. 1B, but here the tracer source in place illustrates a mechanical release tracer source. Since no accumulation of tracer material during shut-in is needed, the mechanical injector device enables forming a tracer cloud during full flow rate. Note that the cloud during such conditions is not expected to have sufficient time to significantly form inside the gravel, so zonal tracer flux signals migrating to the surface may most probably all be high frequency components. A concept of mechanical release of tracer is described in WO2013062417A1.

Figure 7:
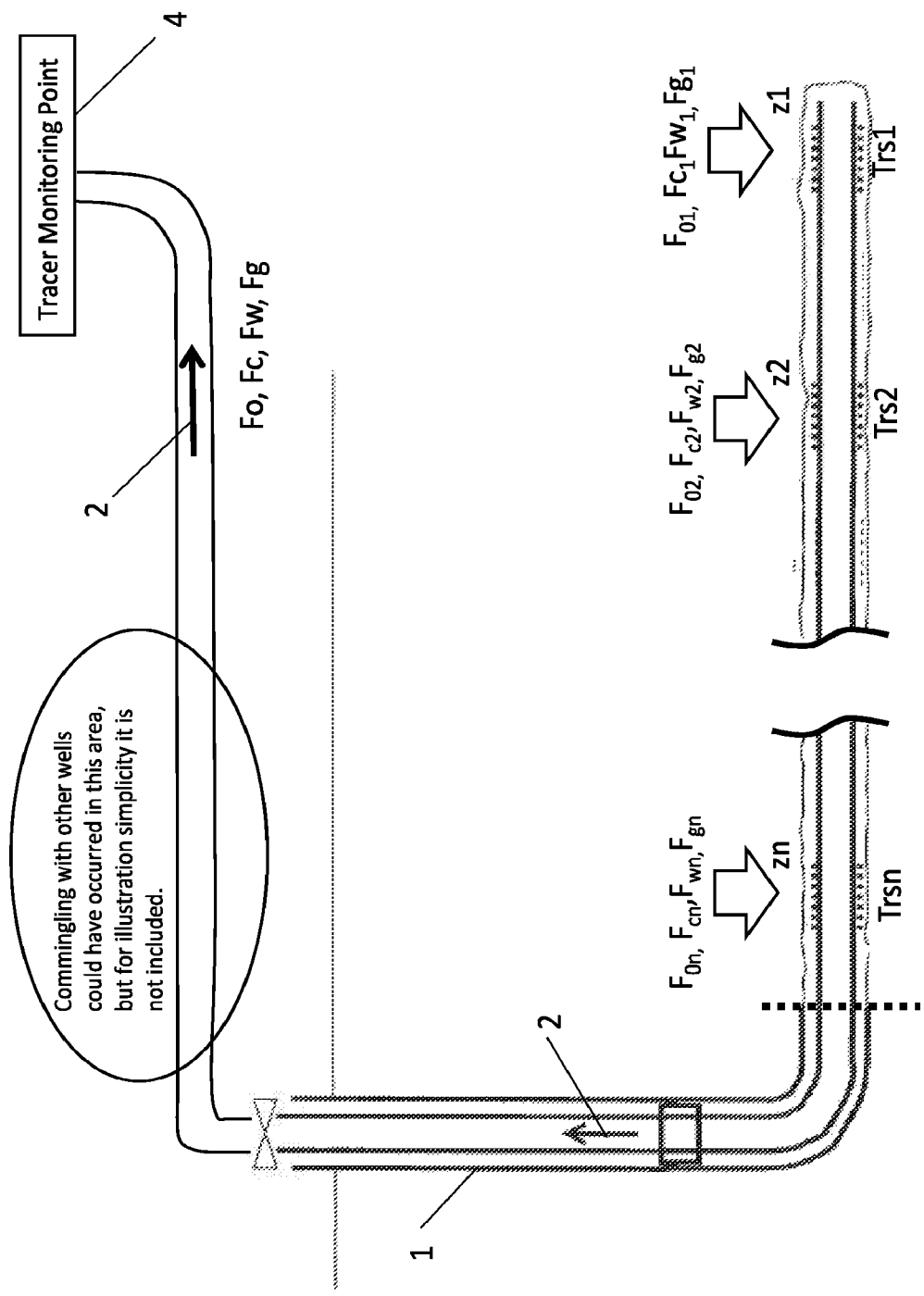

FIG. 7 is a simplified section illustration of a well and its transport system to the tracer sampling/monitoring point, according to the invention. General noise and distortion are described below. The tracer's carrier systems ($Trs_1$, $Trs_n$) are placed each in different production zones (Z) within the annulus up to the borehole wall in said well (1). Possible inflows of oil, gas, water condensate (Fo, Fc, Fw, Fg) for each zone are indicated.

Figure 8:
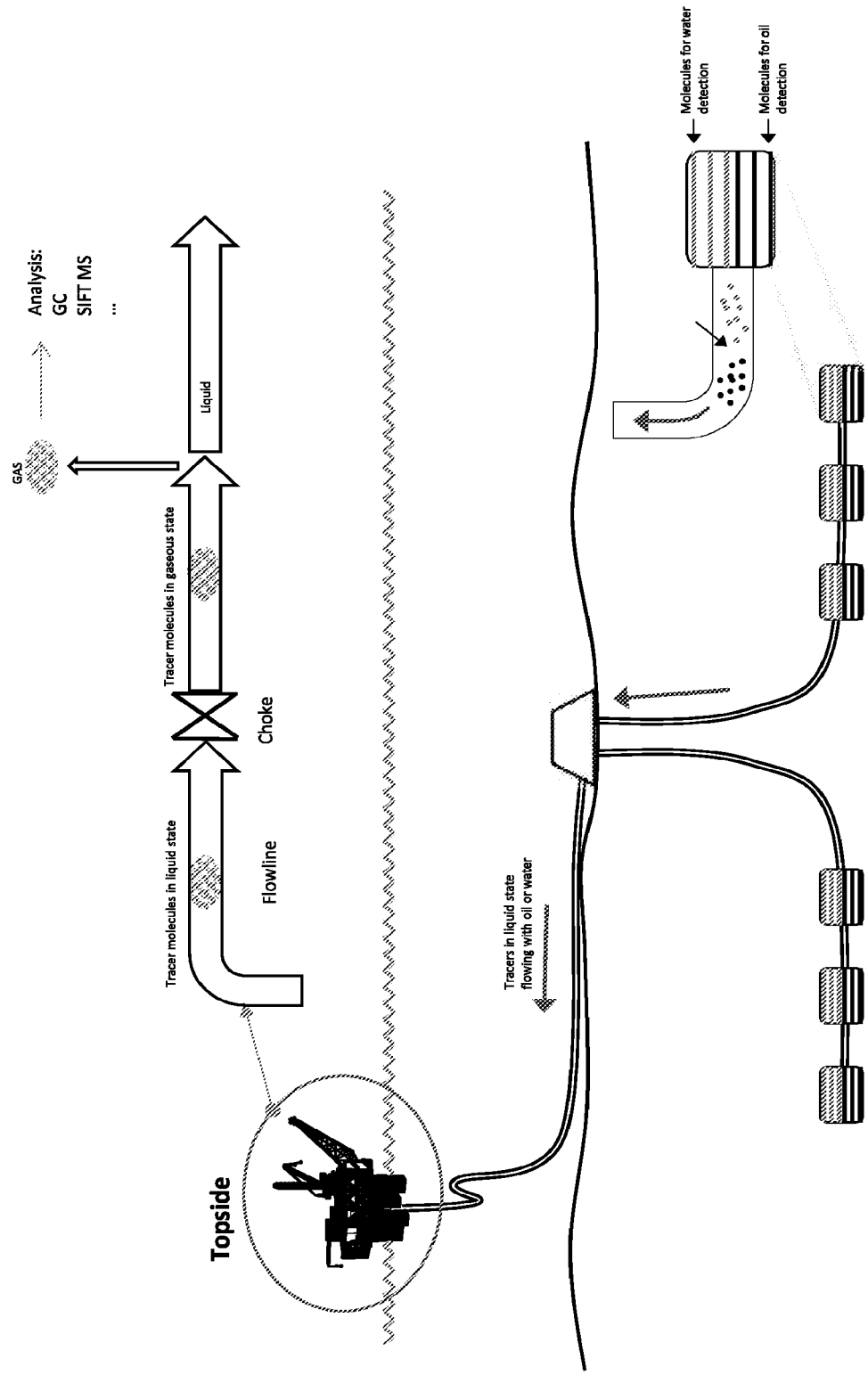

FIG. 8 is an illustration sketch of an embodiment of the invention wherein the tracer is measured in a gaseous phase top side by e.g. GC, SIFT MS etc.

Figure 9:
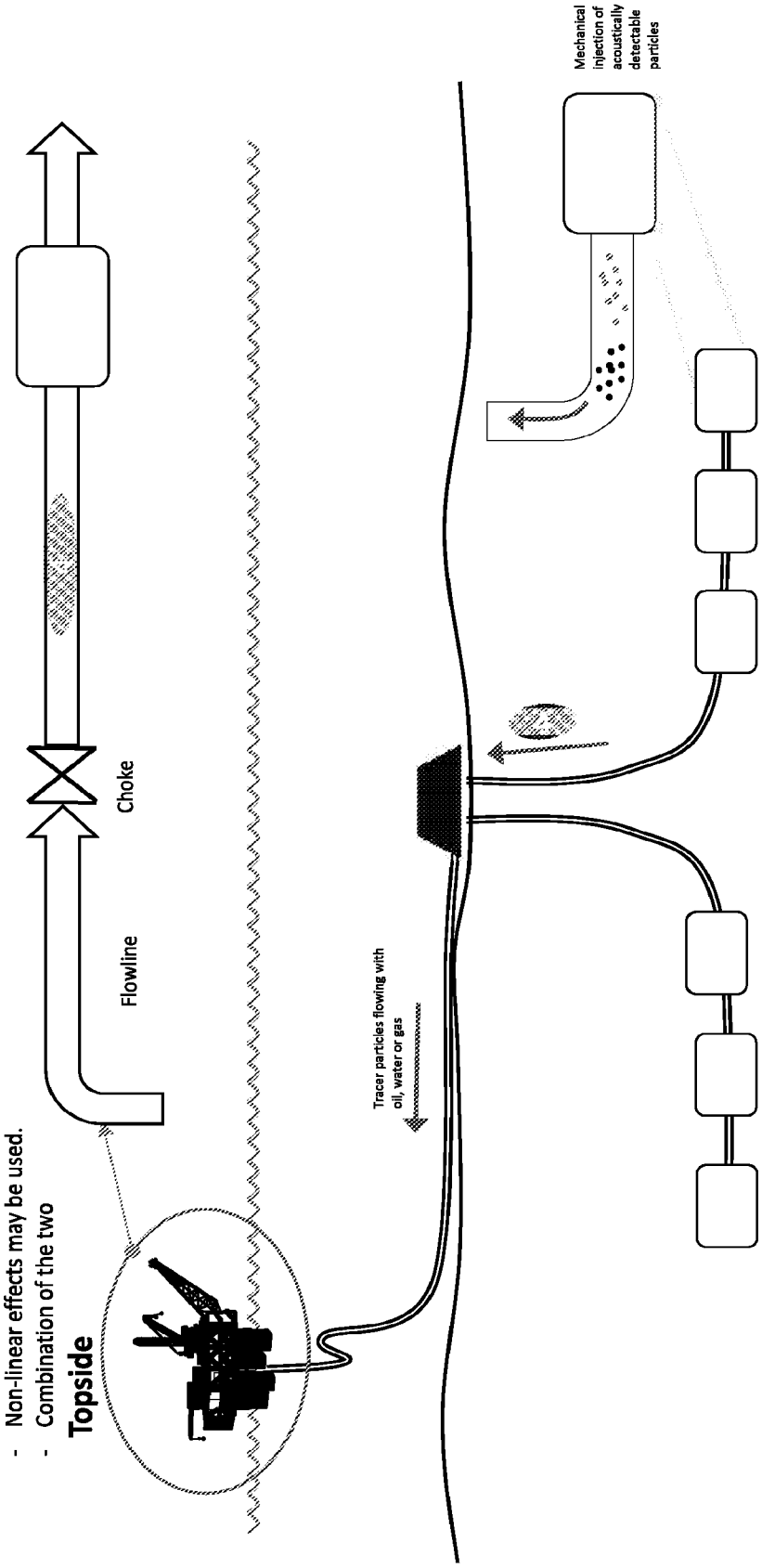

FIG. 9 is an illustration sketch of an embodiment of the invention where each tracer has unique acoustical response and is detected and measured by an acoustic clamp on or in-line tracer measurement device.

FIG. 10 illustrates detection of tracer particles with non-linear acoustic properties compared to the oil or water flow in which they are transported. This may be conducted directly on a phase of the flow.

Figure 11:
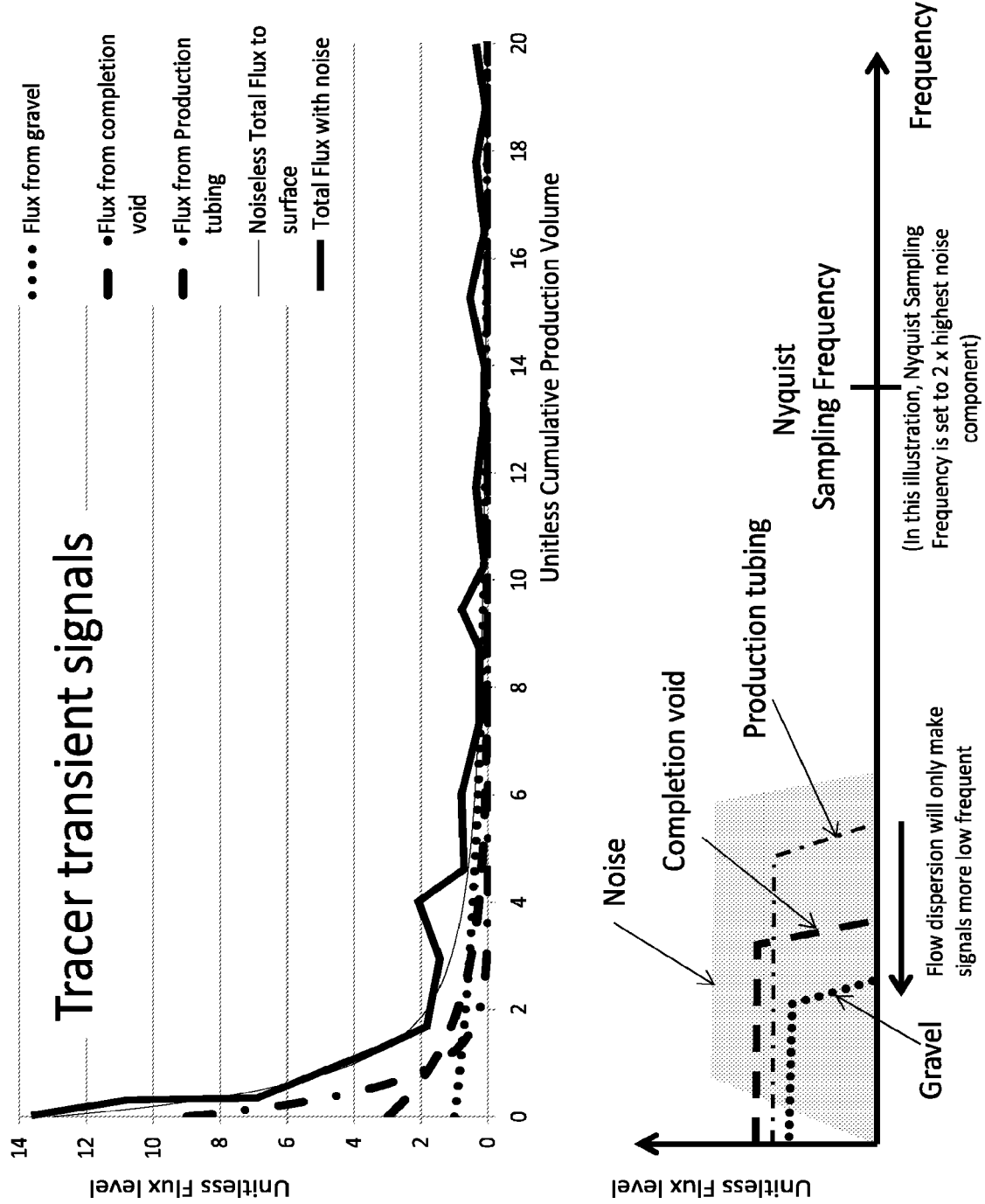

FIG. 11 is an illustration of the zonal tracer flux signal for one single tracer in one single zone. The zonal tracer flux with noise is shown in the upper diagram while it is plotted against frequency in the lower diagram. This illustrates the frequency bands of noise and the different signal components from gravel flush out, void flush out and ultra-high frequency flush out for the tubing. The Nyquist sampling frequency is shown as two times the highest frequency component of either the signals or the noise, whichever has the highest frequency.

FIG. 11a is an illustration of a tracer flux signal for one single tracer, wherein the information carried by the tracer flux is, due to some near steady-state flow condition, low frequent. Note that the noise component may still be high frequent so high sampling frequency will still be needed.

Figure 12:
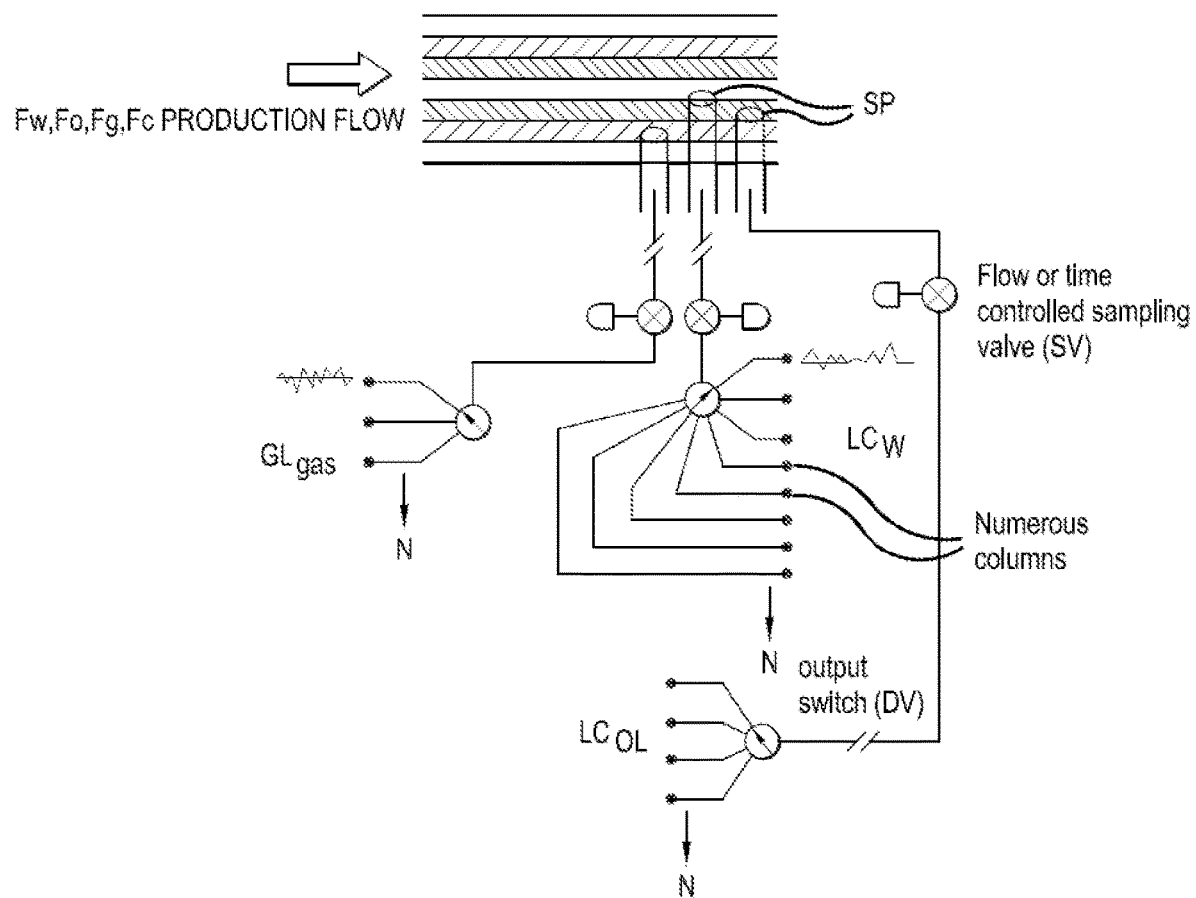

FIG. 12 is an illustration of an embodiment of a multiphase flow fluid sampler according to the invention. Fluid sampler pipes (SP1, SP2, ... ) extend into each separated phase flow (Fw, Fo, Fg, Fc). Fluid sampling valves (SV, SV1, SV2, ... ) and distributing valve (DV, DV1, DV2, ... ), are further arranged at the piping. A manifold valve may be arranged for distributing samples from the sampling valve, so as for distributing consecutive fluid samples to chromatographic columns. This will significantly increase the sampling analysis rate.

Figure 13:
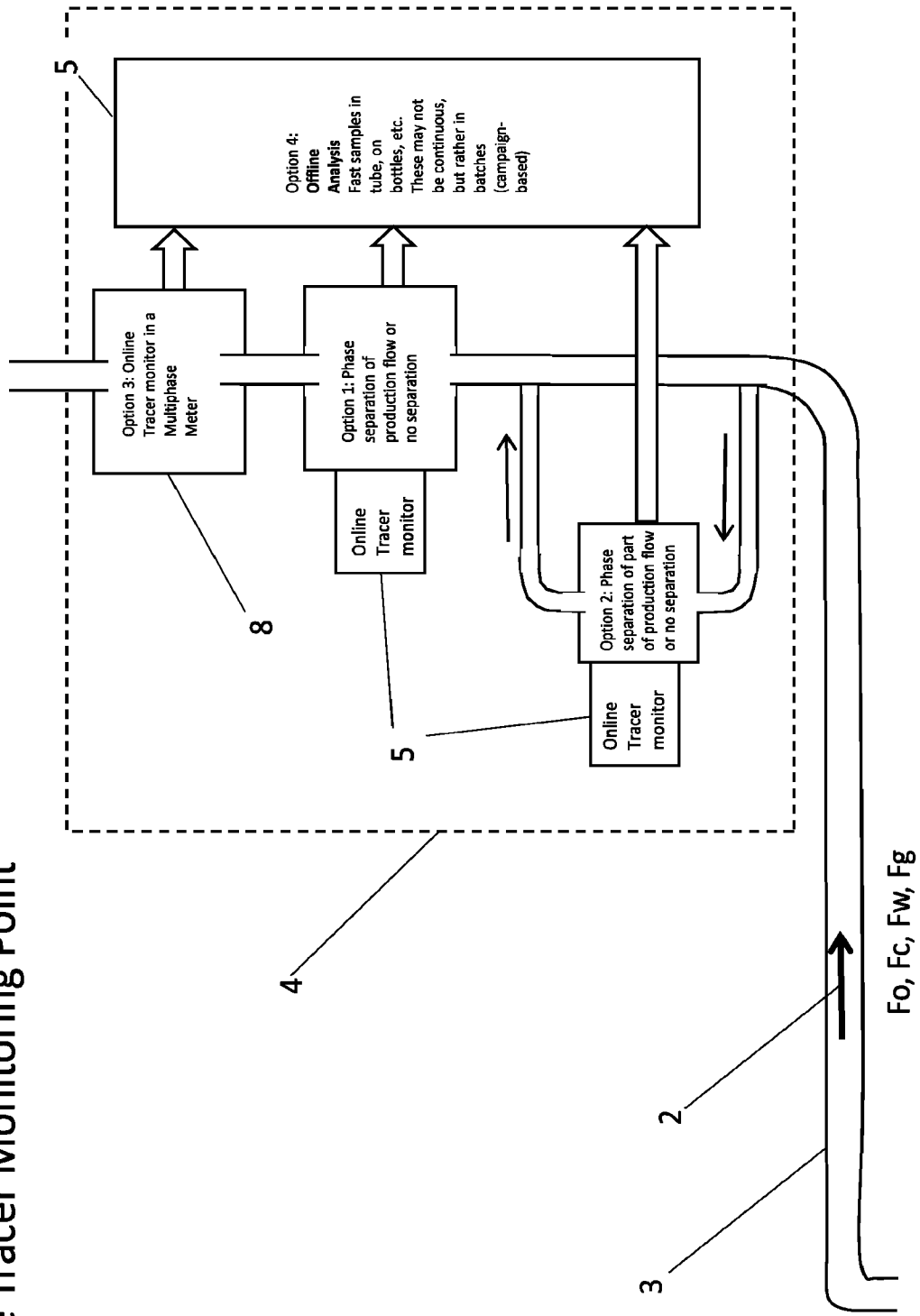

FIG. 13 is a simplified illustration of the process flow according to different embodiments of the invention represented by four different options. The illustration shows embodiments monitoring either conducted on a side branch of the production flow, or at the full production flow. All sampling should obey Nyquist Sampling Theorem and according to the bandwidth of the physics in question. The options/embodiments may operate separately or in combination. Option #4 may be used for campaigns or calibration purposes. Monitors may be calibrated by a manually sampling e.g. on larger volumes of retracted flow fluid samples for analysis in a laboratory.

TECHNICAL FIELD OF THE INVENTION

The applicants studies performed by for instance the concept shown in WO2012057634A where actually measured concentrations and type of tracer material over time, are compared with calculated model concentrations for the type of modeled tracer material and adjusting the model mass influx rates so as for improving the consistency between the model mass influx profile and the real mass influx profile show that tracer transients occurring in the wellbore such as in a completion void, in a screen, in the gravel pack, and possibly in the near wellbore part of the formation, play an important role.

Many real-well studies indicate that tracer transients after shut-in or low rate production perform with significantly longer time constants than what could be expected from the completion voids or the production tubing alone. This can also be concluded from both CFD-simulations and from flow laboratory tests. A plausible explanation is that tracer molecules released during shut-in or low rate production may migrate into the annulus comprising completion voids and gravel pack and possibly into the near wellbore formation either by diffusion if still liquids or by convection if cross flow. This generally creates tracer delay portions around the production tubing, which we may call "delay chambers", a chamber where tracers are delayed according to the characteristic tracer residence time distribution. When production is resumed to its desired flow level there will be flush-outs from delay chambers with different permeabilities, porosities and adhesion parameters that together form the tracer residence times in the different delay chambers that are formed in and around a wellbore, please see illustration in FIG. 1B. To enable the decomposition of the different signal components it is crucial that sufficiently high sampling frequencies are performed (Nyquist). By this it should be possible to identify the different time constants which correspond to the different layers. This is then crucial for estimation of zonal rates.

The applicant's earlier patent publication WO2012057634A is based on tracer transients from completion voids wherein the geometries and flow conditions in the different chambers are assumed to be known. When these assumptions are valid the residence times from the different chambers will mainly be a function of flow rate through the chambers, and the time constants may be compared from one chamber to another, giving relative flow rates.

Exploiting Multi-Chamber Tracer Flush-Outs for Zonal Rate Estimation;

Typically, delay chambers with different residence times are formed from a) production tubing, b) completion voids, c) man-made particle layers in the annulus, such as gravel, d) geological formation.

Significantly different flush-out time constants (residence time distribution) may be derived from the different delay chambers, such as indicated in FIG. 2.

FIG. 3a shows a similar setup as FIG. 1 and which is the geometry through which well inflow is occurring. Note that a tracer release system is now placed into one of the so-called "delay chambers": the completion void.

FIG. 3b show an imagined example where a tracer cloud is formed around a tracer system during shut-in and so that the cloud extends into the annulus: from the production tubing, completion void, and gravel. FIG. 3c-e illustrates the situation after the production is resumed: The part of the tracer cloud that has accumulated in the completion void and the production tubing has shorter tracer residence times and are flushed out faster than the part of the cloud that resides inside the gravel which has both lower permeability and wherein the fluid has a longer distance to go and more possible paths.

Tracer Cloud Forming with Downhole Mechanical Injector

Tracers may be placed in different zones with mechanical injector and/or release systems and may be released as a function of time, at a given condition, or upon a release signal from the surface. More or less the same physics as for the above discussed tracer behavior will be applicable except for some features:

The tracer cloud may not diffuse much into the gravel as for a shut-in volume of fluid so it will have more high frequency components.

The tracer cloud is formed during full production rate, which is a huge benefit due to the undisturbed stability of the production flow.

All flush-outs will be faster and not suffer any of the ramp-up effects that would otherwise cause more uncertain flow dynamics.

The prior art techniques for fluid sampling from the well production flow and analyzing tracer concentration provides up to maximally one fluid sample per hour, which is too low frequent tracer concentration determination for the tracer signal for analyzing dynamic tracer movement within the borehole, and far too low also for characterizing noise in the system.

Thus, there is a need for a new, automated, online, sampling and measurement system for high frequency sampling and analysis.

Sampling Frequency

Distortion and noise;

Distortion and noise are two different undesired effects on signals that will/may happen as tracers are travelling from the production zone (sand face) up to the tracer monitoring point.

Distortion will for transient zonal tracer flux signals be different kinds of dispersion; particles and molecules are smeared out as they migrate. This distortion will only make the signal more low frequent, so for this invention there will be no issues, ref FIG. 11. Distortion may be regarded a change in the original signal.

Noise is an undesired, random signal that is added (superposition) to the zonal tracer flux signal. Noise is added to signals due to different Flow Physical Events when tracers are travelling through the upper part of the well and the subsea flow-lines to reach to the tracer monitoring point (TMP). Noise can randomly fluctuate the signals (flow instabilities), and it disturbs the process of revealing the desired information that was modulated onto the zonal tracer flux in the downhole production zone. To be able to "de-noise" the zonal tracer flux signal we first must assure that the highest tracer noise frequency components practically available are monitored (sampled) according to the Nyquist sampling theorem.

The Nyquist Sampling Theorem Applied for in-Well Tracing;

Any zonal tracer flux signal from a real well may be considered as a signal which comprises components at various frequencies (changes per time unit). Traditionally, tracers from wells are monitored at slow sampling frequencies (each 5 minute or slower) so little experience has been built on finding the real information bandwidth (highest frequency components) that may exist. There may be relevant changes in the sub minute range, so that the bandwidth may be up to 0.1 Hz (one change period per 10 seconds) or even higher frequency. Suppose the highest frequency component for a given zonal tracer flux signal is $f_{max}$. According to the Nyquist Theorem, the tracer monitoring sampling rate must be at least $2f_{max}$, or twice the highest frequency component in the zonal tracer flux signal, ref FIG. 11. That means that in extreme cases, the zonal tracer flux with a sampling frequency of 0.2 Hz (one sample per 5 seconds) may be required.

One such extreme case is when a tracer is injected directly into the production tubing flow and the transport to surface is relatively dispersion-free (short and stable flow path). It may then be required to monitor with a sampling frequency of 0.2 Hz (one sample per 5 sec) to reconstruct the rapid flushout from the downhole production tubing. Another example is when two or more tracer carrying flows from different wells are commingled at a seafloor manifold, and at least one flow source is unstable, e.g. oil-water-gas rates are rapidly varying.

SHORT SUMMARY OF THE INVENTION

The present invention relates to a method and an apparatus for online monitoring of tracer concentration of oil-, condensate-, gas-, or water-following tracers in a production flow in a petroleum well, with to overall objective of estimating the downhole inflow profiles of all phases. The invention comprises a) arranging distinct tracer carrier systems each in different production zones in said well b) said distinct tracer carrier systems arranged for releasing unique tracers to a fluid of said production zones, characterized by c) said tracers having affinity after downhole release to separate phases of oil, condensate, gas, or water) allowing all or part of a production flow of said well to be separated at a downstream location, along a production tubing, into two or more segregated phases of oil, condensate, gas, and water, conducting a continuous loop of the following steps (e)-(g), comprising: e) using an online tracer monitor, conducting sampling of samples at least one of said phases at a high sampling rate of up to one sample per 5 sec.f) using a tracer monitoring system and providing concentration estimates of possibly occurring said unique tracers, said high sampling and analysis rate conducted at a time rate obeying Nyquist sampling of information related to one or more Flow Physical Events and noise, g) based on said concentration values, estimating zonal mass flux of oil, condensate, gas, or water for each sampling time, using said one or more estimated zonal mass fluxes to control said one or more Petro Technical Processes.

DESCRIPTION OF THE INVENTION AND EMBODIMENTS

In the following the invention will be described with references to, but not limited to illustrations in the attached figures.

The applicants work process is related to ACQUIRE and MANAGE raw zonal tracer flux data and finally DELIVER usable information to customers. This invention relates to the ACQUISITION and a method and an apparatus for high frequency online monitoring of zonal tracer flux of oil-, condensate-, gas-, or water-following tracers in a production flow in a petroleum well so as for detecting tracer concentrations that corresponds to so-called "ultra-high frequency" zonal tracer flux signals.

The invention is a tracer method for online monitoring of downhole zonal contributions of oil, condensate, gas, or water mass flux (Foz, Fcz, Fwz, Fgz) of a production flow (2) in a petroleum production well (1), comprising a) arranging distinct tracer carrier systems (Trs1, Trs2, . . . ) each in different production zones (Z1, Z2, . . . ) in said well (1), please see FIG. 7.

b) said distinct tracer carrier systems (Trs1, Trs2, . . . ) arranged for releasing unique tracers (Tr1, Tr2, . . . ) to a fluid of said production zones (Z1, Z2, . . . ); characterized by c) said tracers (Tr1, Tr2, . . . ) having affinity after downhole release to separate phases of oil, condensate, gas, or water with corresponding zonal mass fluxes (Fo, Fc, Fw, Fg), conducting a continuous loop of the following steps (e)-(f), comprising:

e) using an online tracer monitor (5), please see FIG. 13, conducting sampling of tracer concentrations (c1, c2, . . . ) for at least one of the tracers (Tr1, Tr2, . . . ) in said zonal mass fluxes (Fo, Fc, Fw, Fg) at a high sampling rate of up to 1 sample/5 sec, said high sampling and analysis rate conducted at a time rate (R) obeying Nyquist sampling of information related to one or more Flow Physical Events and noise, please see FIG. 11, f) based on said concentration values (c1, c2, . . . ), estimating the corresponding zonal tracer fluxes and ultimately the zonal mass flux of oil, condensate, gas, or water (Foz, Fcz, Fwz, Fgz) for each delivery data point using said one or more estimated zonal mass fluxes (Foz, Fcz, Fwz, Fgz) to control said one or more Petro Technical processes (U1, U2, . . . ), please see FIG. 1B.

In an embodiment of the method according to the invention all or part of a production flow (2) of said well (1) is allowed to separate at a downstream location (4), along a production tubing (3), into two or more segregated phases (Fo, Fc, Fw, Fg) of oil, condensate, gas, and water (o, c, g, w).

In an embodiment the tracer monitor (5) is an online tracer sensor (5s), conducting sampling of samples (s) for at least one of the tracers (Tr1, Tr2, . . . ) in said phases (Fo, Fc, Fw, Fg) at a high sampling rate of up to 1 sample/5 sec and an analyzer (5a), analyzing each said samples (s) and providing discrete concentration estimates (c1, c2, . . . ) of possibly occurring said unique tracers (Tr1, Tr2, . . . ), said high sampling and analysis rate conducted at a time rate (R) obeying Nyquist sampling of information related to one or more petrotechnical processes (U1, U2, . . . ) and noise, mostly as one unit but in some embodiments may be separate units.

By sampling at a high frequency rate one may be able to reconstruct all signal and noise components for the zonal tracer flux. Obeying the Nyquist sampling theorem is a basic requirement for obtaining this. The sampling frequency should be set to twice the signal or noise component that has the highest frequency content. The reconstruction of all signal and noise components is a requirement for separating information from noise. Based on a sequence of high frequency concentration measurements, a good and reliable delivery data point is given, at the frequency that suits the customer's work process.

High frequency raw data enable the estimation of multiple delay chamber flushouts, as indicated in FIG. 2. This is a major advantage of the invention and a requirement for using the delay chambers flushout time constants as carriers of zonal rate information.

The high frequency sampling may also enable a reconstruction of high frequency tracer pulse arrivals. These may in some cases be important carriers of time-of-flight information, —a well-known technique for flow rate estimation.

The separation of the flow may take place close to the choke at the seabed or at the surface platform. The tracer monitor system will be chosen dependent of the separated phase (oil, gas, water, liquid type, etc.) and the type of tracer to be measured. For measuring the tracer concentration of each tracer type there might be used more than one sensor principle. The method is developed for high frequency sampling for monitoring high frequency zonal tracer flux, but for other purposes in may work on a slower basis.

The distinct tracer carrier systems (Trs1, Trs2, . . . ) is arranged each in different production zones (Z1, Z2, . . . ) and close to the sand face. A normal placement is in completion voids like the drainage layer of sand screens.

The main purpose of the invention is monitoring what flows where and how much flows in producing wells. The information created may be used for direct action on one or more Petro Technical Process. One such process is to use the result for controlling the choke for adjusting the petroleum production up or down, such as for improving the oil/water ratio, or for adapting the petroleum/water/gas flow into a production separator and for feeding the data into a model for history matching.

One advantage of the invention is that it is an online automatic monitoring method and it enables not only conducting continuous campaign-based monitoring for one or a few hours, but even monitoring going on for days, continuous monitoring over weeks, months or even years; always with the possibility of catching the most rapid changes and with no manual action required.

In an embodiment of the invention, all or part of a production flow (2) of said well (1) is allowed to be continuously separated, naturally occurring, at said downstream location (4) and in one embodiment all or part of a production flow (2) of said well (1) may be continuously separated, forced in a separator, in-line or in a side branch, at said downstream location (4), see FIG. 13. In an embodiment of the invention the annular separation that is utilized for flow monitoring reasons in some multi-phase flow meters MPFM (8) may also be used for measuring the tracer concentrations. An extra advantage may then be harvested from the correlations with simultaneous high precision estimation of flow rates that are produced by the MPFM. Annular separation will also occur naturally in any flow line and will be amplified through bends; so flow-driven cyclone effects may be used independently of MPFMs. Centrifuges may add efficiency to the separation process.

The Petro Technical processes (U1, U2, . . . ) may comprise one or more of:
  estimating the quality of clean-up and initial inflow profile of one or more component; oil, condensate, gas and water in said well (1),
  estimating the inflow profile of one or more component; oil, condensate, gas and water in said well (1) during normal production,
  updating of reservoir model in general
  changing injection pattern from injection wells
  adjusting remotely operated downhole chokes to change drainage pattern around said well (1),
  alarm water intrusion into one or more of said production zones (Z1, Z2, . . . ) in said well (1),
  performing well flow diagnostics
  performing well integrity diagnostics
  production allocation One or more Petro Technical processes (U1, U2, . . . ) may also be related to operations such as opening or closing valves changing flows, intrusion of water, leaks occurring, periodically changing flow in the reservoir, noise etc.

In an embodiment of the invention wherein the annular separation utilizing an annular flow formation occurring in a multi-phase fluid meter MPFM the online tracer monitor (5) and said multi-phase fluid meter MPFM (8) is arranged near the Earth's surface, either at the seafloor wellhead or at the production platform.

In an embodiment of the invention, the online tracer monitor system (5) and said multi-phase fluid meter MPFM (8) are arranged near the Earth's surface, either at the seafloor wellhead or at the production platform.

In an embodiment of the invention the online tracer monitor system (5) and said multi-phase fluid meter MPFM (8) are arranged downhole near said production zones.

In an embodiment a monitor will have a sampling device, please see an embodiment of such in FIG. 12, that is arranged for instance close to the MPFM. The sampling device will be connected to the sensor and analyzer of the monitor by shorter or rather long piping systems, allowing sensor and analyzer (5) to be placed in non-hazardous environment, such as a control room, a laboratory or another protected place. Sensor and analyzer might be the one and same equipment, a monitor, or parted in physically separated devices, preferably with electronic connection.

In an embodiment of the invention the monitor system (5) and said MPFM (8) is arranged adjacent to a liner hanger (11).

An advantage of sampling tracers and fluid flow at the same location is both that one may utilize the separated flow already separated for the MPFM for the tracer sampling and one is measuring tracer concentrations (c1, c2, . . . ) at the same location in the flow as all other flow parameters are measured by the MPFM (8).

Having the measurements at the same place will provide measurements relating to a common sampling time and are more easily related. Also, having tracers analyzed at the same location as MPFM gives the benefit of directly knowing the flow condition at the location and with a high sampling rate.

In an embodiment of the invention the production flow (2) of said well (1) will be continuously separated into phase flows (Fo, Fc, Fw, Fg) of oil, possibly gas, and water (o, c, g, w) by flashing, i.e. by suddenly decreasing pressure in all or part of the flow (2). The monitoring of the tracers may then be performed by the automatic sampling device topside in a gaseous phase. The tracer sensor is a GC, SIFT MS or the like, as illustrated in FIG. 8. The Tracers used will normally be a liquid at bottom hole pressures and will flash into a gas state when the pressure is reduced. At the topside choke, the pressure is normally reduced from above 10 bars and almost down to 1 bar. Gas is easy to take out in a side-stream topside, and gas+tracer is fed to topside analysis equipment. Many installations do already have GC's or other analysis equipment in place and the tracer analyzing apparatus should be arranged to handle samples as quick as every second. The gas+gaseous tracers can be analyzed online topside with real-time transfer of data to an office, preferably electronic transfer, and further used together with other real time data of physical properties or flow measurements.

In an embodiment of the invention, the affinity properties of one or more of said tracers (Tr1, Tr2, . . . ) are changed between said steps (c) and (d) of c) said tracers (Tr1, Tr2, . . . ) having affinity after downhole release to separate phases of oil, condensate, gas, or water (Fo, Fc, Fw, Fg), d) allowing all or part of a production flow (2) of said well (1) to be continuously separated at a downstream location (4) along a production tubing (3), into two or more segregated phases (Fo, Fc, Fw, Fg) of oil, condensate, gas, and water (o, c, g, w).

One way of doing this is by introducing a soap (a surfactant) for moving the tracer (Tr) from oil (Fo) to water (Fw) or changing the pH of one or more of said fluids in order to shift the tracer (Tr) from oil to water or vice versa.

Moving tracers from one phase to another may allow tracer released or transported by one phase in the tubing to be detected in another phase further downstream and by using the monitor system (5). For instance tracers arranged for optical detection in a water phase may release by, or to, the oil phase but later being detected in the water phase with equipment able to measure in water phase. This method may also be used for other phases e.g. tracers may be detected at a GC arranged for measuring tracers in the gas flow for instance to the flaring system. One may then also measure tracers for more phases without fluid sampling more phases. The transfer of tracers between phases may be performed between any of the phases in the flow and due to particular e.g. tailor made, characteristics of the tracers.

In an embodiment a cyclone (6) is used for centrifuging out tracer particles (Tr), such as from oil to water; in an embodiment by removing a light mantle of the particle to change the bulk tracer particle buoyancy so it can be balanced towards the density of a fluid different from the one it was following due to the affinity. A mantle can also be of greater density so as to change to a heavier phase after it is separated from the bulk particle.

In an embodiment of the invention under step (c), after release the tracers (Tr1, Tr2, . . . ) have affinity to separate phases of oil, condensate, gas, or water (Fo, Fc, Fw, Fg), in that the tracer (Tr1, Tr2, . . . ) will follow the flowing target fluid while running downstream, the affinity is based on properties such as being oleophilic or hydrophilic, or based on equality of densities, or based on surface properties. The tracers (Tr1, Tr2, . . . ) being oleophilic, may also be bound to or residing in a heavy particle (higher density than oil) centrifuge separable from oil to water.

In an embodiment of the invention the distinct tracer carrier systems (Trs1, Trs2, . . . ) is arranged for releasing said unique tracers (Tr1, Tr2, . . . )

on condition of surrounding fluids (so called intelligent release), on demand (on signal form surface or another down hole node), and/or on time.

In an embodiment of the invention one or more of said tracers (Tr1, Tr2, . . . ) are arranged for being detected using optical means (5), and then using such optical means (5) as a detecting sensor. Optical means may in an embodiment be an optical spectroscope. Optical detectors may easily be used for a water phase and also for the gas phase. Optical inspection of the oil phase is not that easy measurement due to the interference in used light area. Optical detection of tracers from the oil phase may rather be detected in another phase after changing phases as mentioned above. An exception is e.g detection of tracers with fluorescent properties that may be optical detectable in or at the surface of an oil phase. In an embodiment comprising tracers arranged for electric detection, then the oil phase will be a suitable monitoring phase. Optical means (5) may, in an embodiment, comprise a laser source and an optical detector.

In an embodiment heavy particles having a density similar to the density of water may be used so as for allowing the particles to migrate into the water and flow with the water, or for allowing the particles to migrate to the oil/water boundary. If oleophilic they may then reside at the interface and be more easily detected. In an embodiment such particles are hydrophobic.

In an embodiment of the invention the one or more tracers (Tr1, Tr2, . . . ) are acoustically detectable. Such tracers could be flexible to be able to be separated from detected other particles in a well, please see FIG. 10. Such acoustic sensors (5) may be an in-line tracer measurement device or it may be an online acoustic clamp on measurement device. This embodiment may be used as a stand-alone method or in combination with other embodiments. Acoustically detectable tracer particles are injected into the downhole production stream in different locations. The tracer particles will carry unique addresses for each zone and will be programmed to follow specific target phases (affinities). The tracer particles may have special and unique acoustical responses so that they will feature different scattering than sand, dirt, gas bubbles etc. Resonance effects, non-linear effects may be used and combination of the two.

In an embodiment of the invention the, one or more of said tracers (Tr1, Tr2, . . . ) are magnetic detectable, and the online tracer sensor (5) is a magnetic in-line tracer measurement device or a magnetic clamp on measurement device. This embodiment may be used as a stand-alone method or in combination with other embodiments.

In an embodiment of the invention the fluid samples is retracted from the flow by a multiphase fluid sampler comprising two or more multiphase fluid sampler pipes (SP1, SP2, . . . ) for collecting fluid samples for each separated phase flow (Fw, Fo, Fg, Fc), each fluid sampling pipe further comprising a fluid sampling valve (SV1, SV2, . . . ), a distributing valve (DV1, DV2, . . . ), distributing single phase fluid samples to one or more sensors and analyzers (5) for measure and analyzing fluid samples at a high measure rate of between 1 measure/5 sec to one measure per 5 minutes, please see FIG. 12. It is an advantage to the invention that the fluid sampling may be controlled by a fluid sampling valve for each phase which may be controlled by instruction signal from an operator, e.g. due to a defined campaign or on a signal set on the basis of another happening such as change in flow, temperature, pressure measured elsewhere in the monitored petroleum system. The distributing valve will distribute fluid samples to the different columns of a sensor (5) or to different sensors or apparatus. This will ensure that tracers in the fluid samples may be detected with the required high speed, such as e.g. every $5^{th}$ second.

In an embodiment of the invention this fluid sampler is connected to a multi phase meter and as well as the tracer sensor and then constituting a complete tracer and flow meter for high frequency online monitoring.

The invention claimed is:

1. A tracer method for online monitoring of downhole zonal contributions of oil, condensate, gas, or water mass flux of a production flow in a petroleum production well, said well having a plurality of well components, the plurality of well components comprising:
   production tubing;
   a completion void;
   a gravel pack; and
   surrounding permeable geological formation,
   wherein each well component acts as a delay chamber during flush out of a tracer-containing fluid out of the well, and each delay chamber, in turn, is associated with a retention time, wherein the retention time of said delay chamber is a measure of the time taken from tracer release, via the delay chamber, to tracer detection topside,
   said method comprising:
   a) arranging one or more distinct tracer carrier systems each in different production zones in said well;
   b) said distinct tracer carrier systems arranged for releasing tracers to a fluid of said production zones;
   c) said tracers having affinity after downhole release to separate phases of oil, condensate, gas, or water with corresponding zonal mass fluxes;
   d) conducting a continuous loop of the following steps (e)-(f), comprising:
   e) using an online tracer monitor, conducting sampling of tracer concentrations for at least one of the tracers in said zonal mass fluxes at a high sampling rate, said high sampling and analysis rate, up to 1 sampling/5 sec, but set and conducted at a time rate obeying Nyquist Theorem for sampling of information related to one or more variations in flow of tracer-containing well fluid and noise, wherein acquired high frequency raw data enables estimation of multiple delay chamber flush outs; and
   f) based on said concentration values of the tracers and the retention times associated with the delay chambers, estimating the corresponding zonal tracer fluxes and the zonal mass flux of oil, condensate, gas, or water for each delivery data point;
   g) using said one or more estimated zonal mass fluxes as input to control said production well.

2. The method according to claim 1, further comprising allowing all or part of a production flow of said well to be separated, into two or more segregated phases of oil, condensate, gas, and water before conducting the continuous loop of step (e)-(f).

3. The method of claim 2, further comprising allowing all or part of a production flow of said well to be continuously separated, naturally occurring, at said downstream location.

4. The method according to claim 1, wherein the step of using a tracer monitor e) comprises applying an online tracer sensor conducting sampling of samples for at least one of the tracers in said phases at a high sampling rate of up to 1 sample/5 sec,
   the method further comprising using an analyzer, analyzing each said samples and providing discrete concentration estimates of possibly occurring said unique tracers, said high sampling and analysis rate conducted at a time rate obeying Nyquist Theorem for sampling of information related to one or more petrotechnical processes and noise.

5. The method of claim 1, further comprising allowing all or part of a production flow of said well to be continuously separated, forced in a separator, in-line or in a side branch, at said downstream location.

6. The method of claim 5, further comprising allowing said production flow of said well to be continuously annular separated into annular phase flows of oil, possibly gas, and water.

7. The method of claim 6, further comprising conducting said annular separation utilizing an annular flow formation occurring in a multi-phase fluid meter (MPFM).

8. The method of claim 1, further comprising using said one or more estimated zonal mass fluxes as input to control one or more petrotechnical processes in said production well,
   said petrotechnical processes comprising one or more of:
   estimating a quality of clean-up and initial inflow profile of one or more component; oil, condensate, gas and water in said well;
   estimating the inflow profile of one or more component; oil, condensate, gas and water in said well during normal production;
   updating of a reservoir model;
   changing injection pattern from injection wells;
   adjusting remotely operated downhole chokes to change drainage pattern around said well;
   alarm water intrusion into one or more of said production zones in said well;
   performing well flow diagnostics;
   performing well integrity diagnostics;
   performing production allocation;
   infill drilling optimization; and
   completion optimization and verification.

9. The method of claim 1, further comprising allowing said production flow of said well to be continuously separated into phase flows of oil, condensate, gas, and/or water by suddenly decreasing pressure in all or part of the flow.

10. The method of claim 1, wherein after said step (c), allowing all or part of a production flow of said well to be continuously separated at a downstream location along a production tubing, into two or more segregated phases of oil, condensate, gas, and water, at one instant, changing the affinity properties of one or more of said tracers.

11. The method of claim 1, wherein under step (c), said tracers after release having affinity to separate phases of oil, condensate, gas, or water, in that the tracer will follow the flowing target fluid while running downstream, said affinity being based on oleophilic or hydrophilic properties of the tracers, or based on equality of densities.

12. The method of claim 1, each said tracer arranged for conditional release, said distinct tracer carrier systems being arranged for releasing said unique tracers:
- on condition;
- on demand from the surface or another downhole node; and/or
- on time.

13. The method according to claim 1, wherein one or more of said tracers are arranged for being detected using optical sensors.

14. The method according to claim 1, wherein said tracers are oleophilic, and said tracers are bound to or reside in a heavy particle centrifuge, and
    wherein particles in the centrifuge have a density similar to the density of water and said particles having a higher density than oil.

15. The method according to claim 1, wherein one or more of said tracers are acoustically detectable.

16. The method according to claim 1, wherein one or more of said tracers are magnetically detectable.

17. The method according to claim 1, wherein one or more of said tracers are isotopes and detectable by radiation sensors.

18. The method according to claim 1, wherein one or more of said tracers are based on Radio-frequency Identification (RFID) and detectable via electromagnetic waves.

19. The method according to claim 1, wherein one or more of said tracers are chemical tracers.

* * * * *